United States Patent
Yang et al.

(10) Patent No.: US 9,609,276 B2
(45) Date of Patent: *Mar. 28, 2017

(54) RESOURCE-ADAPTIVE VIDEO ENCODER SHARING IN MULTIPOINT CONTROL UNIT

(71) Applicant: Dialogic Corporation, Montreal (CA)

(72) Inventors: Kyeong Ho Yang, Freehold, NJ (US); Lawrence Kolakowski, Bridgewater, NJ (US)

(73) Assignee: Dialogic Corporation, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,320

(22) Filed: Oct. 26, 2015

(65) Prior Publication Data

US 2016/0044280 A1 Feb. 11, 2016

Related U.S. Application Data

(63) Continuation of application No. 14/304,144, filed on Jun. 13, 2014, now Pat. No. 9,210,381.
(Continued)

(51) Int. Cl.
*H04N 7/15* (2006.01)
*H04N 19/503* (2014.01)
(Continued)

(52) U.S. Cl.
CPC ............. *H04N 7/152* (2013.01); *H04N 19/42* (2014.11); *H04N 19/503* (2014.11); *H04N 19/593* (2014.11); *H04N 19/91* (2014.11)

(58) Field of Classification Search
CPC ...... H04N 7/152; H04N 19/42; H04N 19/503; H04N 19/593; H04N 19/91
(Continued)

(56) References Cited

U.S. PATENT DOCUMENTS 5,838,664 A 11/1998 Polomski
6,006,253 A 12/1999 Kumar et al.
(Continued)

OTHER PUBLICATIONS

Thomas Wiegand, et al., "Overview of the H.264/AVC Video Coding Standard", IEEE Transactions on Circuits and Systems for Video Technology, vol. 13, No. 7, Jul. 2003, pp. 560-576.

*Primary Examiner* — Gerald Gauthier
(74) *Attorney, Agent, or Firm* — Chapin IP Law, LLC

(57) ABSTRACT

Systems and methods of video conferencing, in which existing video encoders associated with a multipoint control unit (MCU) can be shared among conference participant devices, depending upon the availability of processor and/or memory resources for the MCU. In making decisions regarding the sharing of video encoders, the systems and methods take into account various parameters associated with potential conference participant devices and the total cost of the processor/memory resources for the MCU, to determine whether a video encoder of the MCU can be shared with, or allocated to, the respective conference participant devices. By determining whether to share or allocate a video encoder of the MCU, depending upon the available processor/memory resources for the MCU, the MCU can be made to operate with increased stability. The systems and methods can be applied to any application that sends the same content to multiple receivers, including announcement and video streaming applications.

19 Claims, 9 Drawing Sheets

Related U.S. Application Data

(60) Provisional application No. 61/838,580, filed on Jun. 24, 2013.

(51) Int. Cl.
  *H04N 19/593* (2014.01)
  *H04N 19/91* (2014.01)
  *H04N 19/42* (2014.01)

(58) Field of Classification Search
  USPC ............... 348/14.09, 14.07, 14.08, 469;
  375/240.03, 240.24, 240.01; 709/219,
  709/204; 382/246
  See application file for complete search history.

(56) References Cited

U.S. PATENT DOCUMENTS

| | | | |
|---|---|---|---|
| 6,012,091 A * | 1/2000 | Boyce | G06T 9/004 |
| | | | 348/E5.008 |
| 6,275,471 B1 | 8/2001 | Bushmitch et al. | |
| 6,704,769 B1 | 3/2004 | Comstock et al. | |
| 7,085,322 B2 | 8/2006 | Ngai et al. | |
| 7,113,992 B1 | 9/2006 | Even | |
| 7,174,365 B1 | 2/2007 | Even et al. | |
| 7,403,562 B2 | 7/2008 | Yang | |
| 7,957,600 B2 | 6/2011 | Yange | |
| 8,000,319 B2 | 8/2011 | Gavish et al. | |
| 8,224,885 B1 | 7/2012 | Doucette et al. | |
| 8,442,120 B2 * | 5/2013 | Hong | H04N 7/152 |
| | | | 375/240.02 |
| 8,447,023 B2 | 5/2013 | Nimri et al. | |
| 8,514,265 B2 | 8/2013 | Goyal et al. | |
| 8,561,116 B2 | 10/2013 | Hasek | |
| 8,588,296 B2 | 11/2013 | Yang | |
| 8,675,524 B2 | 3/2014 | Karam et al. | |
| 8,780,978 B2 * | 7/2014 | Polisetty | G10L 25/78 |
| | | | 375/240.03 |
| 8,917,635 B2 | 12/2014 | Hagendorf | |
| 9,094,685 B2 | 7/2015 | Yang | |
| 9,118,807 B2 * | 8/2015 | Bright-Thomas | H04N 7/152 |
| 9,118,808 B2 * | 8/2015 | Graff | H04N 7/152 |
| 9,172,924 B1 * | 10/2015 | Martel | H04N 7/24 |
| 9,210,381 B2 | 12/2015 | Yang | |
| 9,215,413 B2 * | 12/2015 | Bright-Thomas | H04N 19/30 |
| 9,247,197 B2 * | 1/2016 | Maltagliati | H04N 7/08 |
| 9,286,082 B1 * | 3/2016 | Hobbs | G06F 3/1454 |
| 2008/0059581 A1 * | 3/2008 | Pepperell | H04L 12/1827 |
| | | | 709/204 |
| 2008/0136898 A1 * | 6/2008 | Eisenberg | H04N 7/152 |
| | | | 348/14.09 |
| 2008/0218585 A1 * | 9/2008 | Wagner | H04N 5/262 |
| | | | 348/14.09 |
| 2011/0295996 A1 | 12/2011 | Qui et al. | |
| 2012/0140020 A1 * | 6/2012 | Rosenberg | H04N 7/147 |
| | | | 348/14.07 |
| 2014/0184730 A1 * | 7/2014 | Liu | H04N 13/0029 |
| | | | 348/14.08 |
| 2014/0375756 A1 * | 12/2014 | Yang | H04N 7/152 |
| | | | 348/14.09 |
| 2014/0376617 A1 * | 12/2014 | Yang | H04N 19/147 |
| | | | 375/240.03 |
| 2014/0376632 A1 | 12/2014 | Yang et al. | |
| 2015/0244650 A1 | 8/2015 | Yang | |
| 2016/0219248 A1 * | 7/2016 | Reznik | H04N 21/2343 |

* cited by examiner

RESOURCE-ADAPTIVE VIDEO ENCODER SHARING IN MULTIPOINT CONTROL UNIT

CROSS REFERENCE TO RELATED APPLICATIONS

This application is a continuation of U.S. patent application Ser. No. 14/304,144 filed Jun. 13, 2014 entitled RESOURCE-ADAPTIVE VIDEO ENCODER SHARING IN MULTIPOINT CONTROL UNIT, and claims benefit of the priority of U.S. Provisional Patent Application No. 61/838,580 filed Jun. 24, 2013 entitled RESOURCE-ADAPTIVE VIDEO ENCODER SHARING IN MULTIPOINT CONTROL UNIT.

TECHNICAL FIELD

The present application relates generally to systems and methods of video conferencing involving multipoint control units and multiple conference participant devices, and more specifically to systems and methods of video conferencing in which at least one video encoder within a multipoint control unit can be shared among at least some of the conference participant devices, depending upon at least an amount of processor resources and/or memory resources available to the multipoint control unit.

BACKGROUND

In recent years, multimedia communications over wired and/or wireless packet communications networks such as the Internet have gained increased popularity. Such multimedia communications can be performed within the context of video conferencing systems, in which multipoint control unit(s) (MCU(s)) are typically employed to facilitate collaboration among groups of conference participant devices by performing various functions such as mixing, synchronizing, encoding, decoding, and/or transcoding video bitstreams and/or audio bitstreams generated by the respective conference participant devices.

In order to maintain an acceptable multimedia quality of experience (QoE) for a group of conference participant devices in such video conferencing systems, separate video encoders of an MCU can be assigned for sole use by the respective conference participant devices. Moreover, in order to maintain a high level of performance in such video conferencing systems, some or all of the conference participant devices can share, at least at some times, the same video encoder of the MCU. However, in conventional video conferencing systems, it can be difficult to balance the tradeoff between the benefits of maintaining an acceptable multimedia QoE for the respective conference participant devices, and maintaining a high level of performance for the overall video conferencing systems.

In addition, in such video conferencing systems, successful transmissions of multimedia data between an MCU and a group of conference participant devices over a packet communications network generally require sufficient bandwidth and low latency for minimal packet loss. Such transmissions of multimedia data between the MCU and the respective conference participant devices are typically based upon the real-time transport protocol (RTP), while delivery of such multimedia data to the respective conference participant devices is typically monitored by the MCU using the real-time transport control protocol (RTCP). For example, a respective conference participant device that receives multimedia data in the form of RTP packets from the MCU can provide packet error feedback information to the MCU in one or more RTCP feedback packets.

Maintaining successful multimedia communications in such video conferencing systems can be problematic, however, particularly when transmissions of multimedia data are performed over packet communications networks such as the Internet. For example, while engaging in video conferencing over the Internet, a group of conference participant devices may be subjected to different levels of network congestion, which can result in reduced bandwidth, increased latency, and ultimately increased packet losses, potentially degrading the multimedia QoE for one, some, or all of the respective conference participant devices in the group.

The situation can be even more problematic when some of the conference participant devices in a group share the same video encoder of an MCU. For example, if a respective one of the conference participant devices in the group has a video encoder assigned to it for its sole use, and, at some point, the respective conference participant device experiences increased packet losses, then the respective conference participant device can provide packet error feedback information to the MCU. Further, having received the packet error feedback information from the respective conference participant device, the MCU can react to the packet error feedback information by providing one or more control parameters to the video encoder in an effort to improve the multimedia QoE for that respective conference participant device.

However, if the respective conference participant device that experiences increased packet losses were instead required to share a video encoder with another conference participant device(s) in the group, then the MCU's reaction to the packet error feedback information, while possibly improving the multimedia QoE for the respective conference participant device currently experiencing packet losses, may inadvertently degrade the multimedia QoE for the other conference participant device(s) in the group.

SUMMARY

In accordance with the present application, systems and methods of multimedia communications are disclosed herein, in which at least one video encoder of a multipoint control unit (MCU) can be shared among a plurality of multimedia participant devices, depending upon at least a current availability of processor resources and/or memory resources for the MCU. In one aspect, the plurality of multimedia participant devices are each communicably coupleable to the MCU over a wired and/or wireless communications network, such as a packet communications network, or any other suitable network. The MCU includes a controller, at least one video encoder, a plurality of network adapters, and a data storage. The controller includes a bitrate adjustment component, a video encoder manager, and a resource monitor. For example, the multimedia communications systems may be video conferencing systems, or any other suitable multimedia communications systems. Further, the MCU may be any suitable multimedia communications server, and the plurality of multimedia participant devices may each be a conference participant device or any other suitable multimedia communications client or server.

In making decisions regarding the sharing of video encoders associated with the MCU, the multimedia communications system takes into account various characteristic parameters associated with the plurality of multimedia participant devices to determine whether at least one existing video encoder of the MCU can support a respective one of the plurality of multimedia participant devices. In the event at least one existing video encoder of the MCU can support the respective multimedia receiver, the multimedia communications system calculates, determines, or otherwise obtains a total cost of video encoder sharing (also referred to herein as a/the "total video encoder sharing cost") for each of the existing video encoders, using a number of specified types of costs, including, but not limited to, specified cost types relating to frame size, frame rate, and/or bitrate, and selects the existing video encoder that has the lowest total video encoder sharing cost. The multimedia communications system takes into further account the current availability of processor resources and/or memory resources for the multimedia bridge device, and determines a total cost of resources (also referred to herein as a/the "total resource cost") that may be allocated for the creation or implementation of an additional video encoder for subsequent assignment, at least temporarily, to the respective multimedia receiver.

If the total resource cost for allocating resources to the creation or implementation of an additional video encoder exceeds the total video encoder sharing cost for a selected video encoder, based at least upon a comparison of the respective costs, then the multimedia communications system shares an existing video encoder of the MCU with the respective multimedia receiver. If the total resource cost does not exceed the total video encoder sharing cost, or if none of the existing video encoders of the MCU can support the respective multimedia receiver, then the multimedia communications system creates, implements, provides, or otherwise obtains an additional video encoder of the MCU to which the respective multimedia receiver might subsequently be at least temporarily assigned.

By determining whether to share an existing video encoder (or create an additional video encoder) associated with an MCU, depending upon at least the processor resources and/or memory resources currently available to the MCU, such an MCU can be made to operate with increased stability.

Systems and methods of handling packet errors in such multimedia communications systems are further disclosed herein, in which the MCU can send, in a real-time transport protocol (RTP) session, a plurality of multimedia streams to the plurality of multimedia participant devices, respectively. Further, at least a respective one of the plurality of multimedia participant devices can, at least at some times, provide packet error feedback information to the MCU in one or more real-time transport control protocol (RTCP) feedback packets. For example, the packet error feedback information can include at least a Picture Loss Indication (PLI) message, an RTCP feedback packet such as an RTCP receiver estimated maximum bitrate (REMB) packet (also referred to herein as an/the "REMB message"), and/or a General Negative Acknowledgment (GNACK) message.

Having received the packet error feedback information from the respective multimedia receiver, the MCU can generate and send an intra-coded frame (also referred to herein as an/the I-frame) over a transmission path to the receiving side of the RTP session (assuming that such packet error feedback information includes at least a PLI message), depending upon at least a cost associated with providing the I-frame to the other multimedia receiver(s) that might share the same video encoder as the respective multimedia receiver. Further, the MCU can adjust the average bitrate employed in the RTP session to be equal to or lower than an estimated available bitrate for the respective multimedia receiver (assuming that such packet error feedback information includes at least an REMB message), based at least upon the estimated available bitrate for the respective multimedia receiver, a maximum available bitrate among available bitrates for the plurality of multimedia participant devices, and/or a minimum available bitrate among the available bitrates for the plurality of multimedia participant devices.

By taking into account (1) the cost of providing an I-frame to the other multimedia receiver(s) before sending the I-frame over the transmission path to the receiving side of the RTP session, and/or (2) the estimated available bitrate for the respective multimedia receiver, the maximum available bitrate among available bitrates for the plurality of multimedia participant devices, and/or the minimum available bitrate among the available bitrates for the plurality of multimedia participant devices before adjusting the average bitrate employed in the RTP session, the MCU can provide an appropriate reaction to the packet error feedback information provided by the respective multimedia receiver. In this way, an improved average quality of experience (QoE) for multimedia transmissions to each of the plurality of multimedia participant devices that share the same video encoder of the MCU can be achieved.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION

Figure 1:
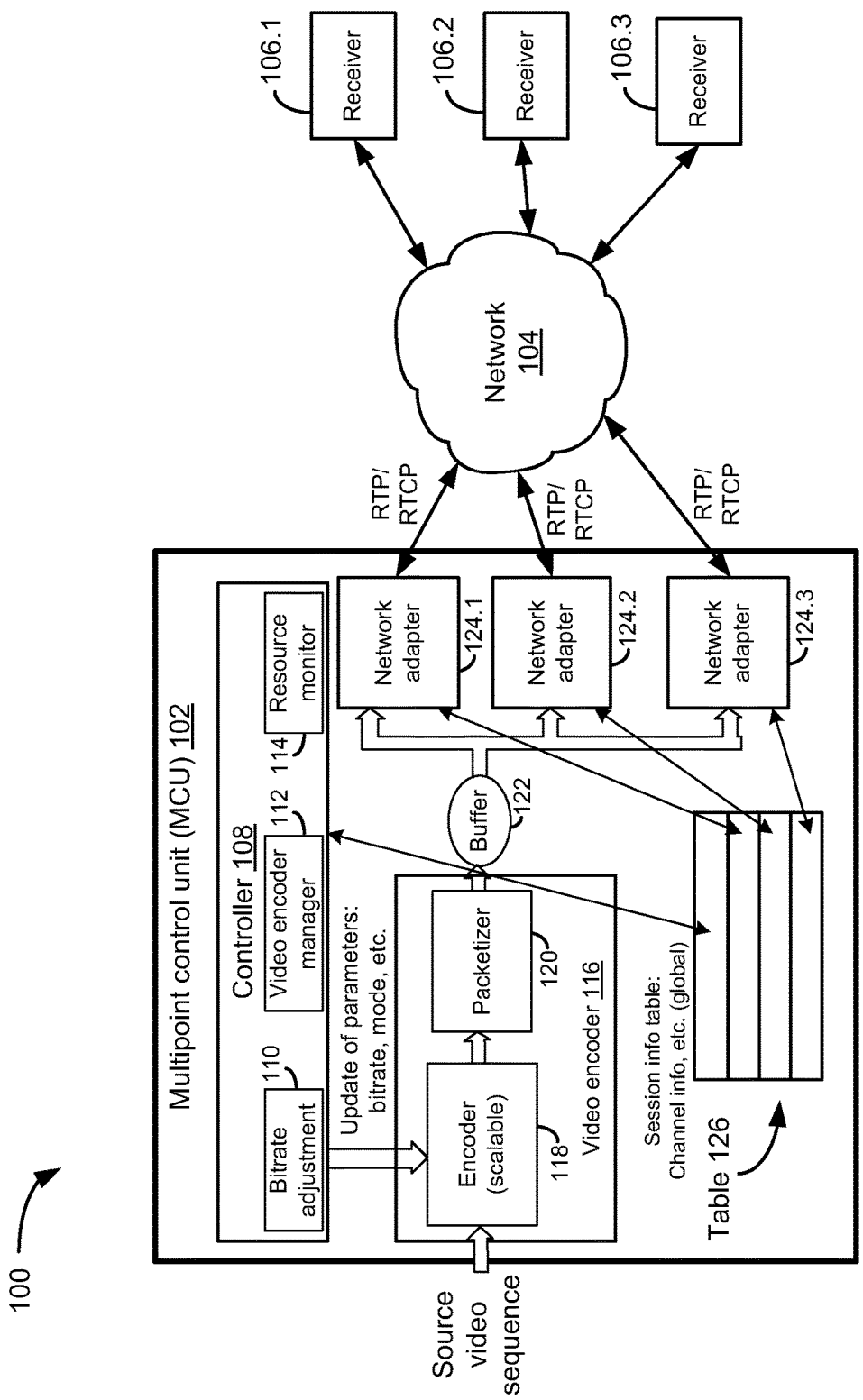
FIG. 1 is a block diagram of an exemplary video conferencing system, which includes an exemplary multipoint control unit (MCU) configured in accordance with the present application.

The disclosures of U.S. patent application Ser. No. 14/304,144 filed Jun. 13, 2014 entitled RESOURCE-ADAPTIVE VIDEO ENCODER SHARING IN MULTIPOINT CONTROL UNIT, and U.S. Provisional Patent Application No. 61/838,580 filed Jun. 24, 2013 entitled RESOURCE-ADAPTIVE VIDEO ENCODER SHARING IN MULTIPOINT CONTROL UNIT are hereby incorporated herein by reference in their entirety.

Systems and methods of multimedia communications are disclosed, in which at least one video encoder of a multipoint control unit (MCU) can be shared among a plurality of multimedia participant devices, depending upon at least a current availability of processor resources and/or memory resources for the MCU. For example, the systems may be video conferencing systems, or any other suitable multimedia communications systems. Further, the MCU may be any suitable multimedia communications server, and the plurality of multimedia participant devices may each be a conference participant device or any other suitable multimedia communications client or server.

In making decisions regarding the sharing of video encoders associated with the MCU, the disclosed systems and methods take into account various parameters associated with the plurality of multimedia participant devices to determine whether at least one existing video encoder of the MCU can support a respective one of the plurality of multimedia participant devices. In the event at least one existing video encoder of the MCU can support the respective multimedia receiver, the disclosed systems and methods calculate, determine, or otherwise obtain a total cost of video encoder sharing (also referred to herein as a/the "total video encoder sharing cost") for each of the existing video encoders, using a number of specified types of costs, including, but not limited to, specified cost types relating to frame size, frame rate, and/or bitrate, and select the existing video encoder that has the lowest total video encoder sharing cost. The disclosed systems and methods take into further account the availability of processor resources and/or memory resources for the multimedia bridge device, and determine a total cost of resources (also referred to herein as a/the "total resource cost") that may be allocated for the creation or implementation of an additional video encoder that might be at least temporarily assigned to the respective multimedia receiver.

If the total resource cost for allocating resources to the creation or implementation of an additional video encoder exceeds the total video encoder sharing cost for a selected video encoder, based at least upon a comparison of the respective costs, then the disclosed systems and methods share an existing video encoder of the MCU with the respective multimedia receiver. If the total resource cost does not exceed the total video encoder sharing cost for the selected video encoder, or if none of the existing video encoders of the MCU can support the respective multimedia receiver, then the disclosed systems and methods create, implement, provide, or otherwise obtain an additional video encoder of the MCU to which the respective multimedia receiver might subsequently be at least temporarily assigned.

By determining whether to share an existing video encoder (or create an additional video encoder) associated with the MCU, depending upon at least the processor resources and/or memory resources currently available to the MCU, such an MCU can be made to operate with increased stability. It is noted that the systems and methods described herein can be applied to any applications, servers, or systems that can send the same multimedia content to multiple clients, including, but not limited to, video conferencing systems, announcement systems, and live streaming systems.

FIG. 1 depicts an exemplary video conferencing system 100 including an exemplary MCU 102 that can be configured to share the functionality of one or more video encoders (such functionality including, but not limited to, mixing, synchronizing, encoding, decoding, and/or transcoding video bitstreams and/or audio bitstreams) among a plurality of exemplary multimedia participant devices (such as a plurality of conference participant devices 106.1, 106.2, 106.3), depending upon at least the current availability of processor resources and/or memory resources for the MCU 102, in accordance with the present application. As shown in FIG. 1, the respective conference participant devices 106.1, 106.2, 106.3 are each communicably coupleable to the MCU 102 over a wired and/or wireless communications network 104, such as a packet communications network or any other suitable network. The MCU 102 includes a controller 108, at least one video encoder 116, a buffer 122, a plurality of network adapters 124.1, 124.2, 124.3, and a data storage including a table 126. The controller 108 includes a bitrate adjustment component 110, a video encoder manager 112, and a resource monitor 114. The video encoder 116 can include a video encoder component 118, as well as a video packetizer 120.

It is noted that the video encoder component 118 can be a scalable or non-scalable video encoder. Further, video packets can be exchanged between the MCU 102 and the respective conference participant devices 106.1, 106.2, 106.3 over the network 104 in conformance with RFC 3550—*RTP: A Transport Protocol for Real-Time Applications*, July 2003, or latest revision. Sets of such video packets can form multiple video frames, which can conform to the H.264 Advanced Video Coding (AVC) video format, the ISO/IEC 23008-2 and ITU-T Recommendation H.265 video format (also referred to as the "high efficiency video coding standard" or "HEVC standard"), the VP8 video format, or any other suitable video format.

In an exemplary mode of operation, when a respective one of the conference participant devices 106.1, 106.2, 106.3 (also referred to herein as a/the "respective conference participant device") attempts to join a video conference, the respective conference participant device can request the use of a video encoder of the MCU 102, e.g., by providing, to the video encoder manager 112, one or more video encoder attributes, such as a codec type, a frame size, a frame rate, a target bitrate, etc. Based at least upon the processor resources and/or the memory resources available to the MCU 102, as well as the attributes of one or more existing video encoders of the MCU 102, the video encoder manager 112 decides whether to allocate processor and/or memory resources of the MCU 102 for the creation or implementation of an additional video encoder to which the respective conference participant device may subsequently at least temporarily be assigned, or to share the operations of an existing video encoder of the MCU 102 with the respective conference participant device.

It is noted that available bandwidths for the respective conference participant devices 106.1, 106.2, 106.3 may be different, depending upon at least their associated network conditions, and therefore it may be beneficial to employ a scalable video encoder operative to cover the bandwidth requirements of some or all of the conference participant devices 106.1, 106.2, 106.3. It is further noted that the actual video transmission rate provided by such a scalable video encoder to each of the conference participant devices 106.1, 106.2, 106.3 may be refined at the respective network adaptors 124.1, 124.2, 124.3, e.g., by dropping one or more disposable video frames. Each network adaptor 124.1, 124.2, or 124.3 can estimate the bandwidths for the respective conference participant devices 106.1, 106.2, 106.3 based upon one or more real-time transport control protocol (RTCP) feedback messages sent to the network adapter 124.1, 124.2, or 124.3 by the respective conference participant devices 106.1, 106.2, 106.3, or in any other standards-based or non-standards-based fashion. The respective network adapters 124.1, 124.2, 124.3 can store information pertaining to the estimated bandwidths in the table 126 for subsequent access by the video encoder manager 112, which can use that information when making decisions as to which video encoder(s) of the MCU 102 to share with the respective conference participant devices 106.1, 106.2, 106.3.

In making decisions regarding the sharing of a video encoder(s) of the MCU 102, the video encoder manager 112 can take into account various characteristic parameters associated with video decoders (not shown) associated with the respective conference participant devices 106.1, 106.2, 106.3 to determine whether at least one existing video encoder of the MCU 102 can support a respective one of the conference participant devices 106.1, 106.2, 106.3. Such parameters characteristic of the video decoders can include, but are not limited to, a layout ID, the codec type, and one or more specific features that the respective video decoders support (e.g., the slice type, entropy coding, data partitioning, etc.).

Figure 2A:
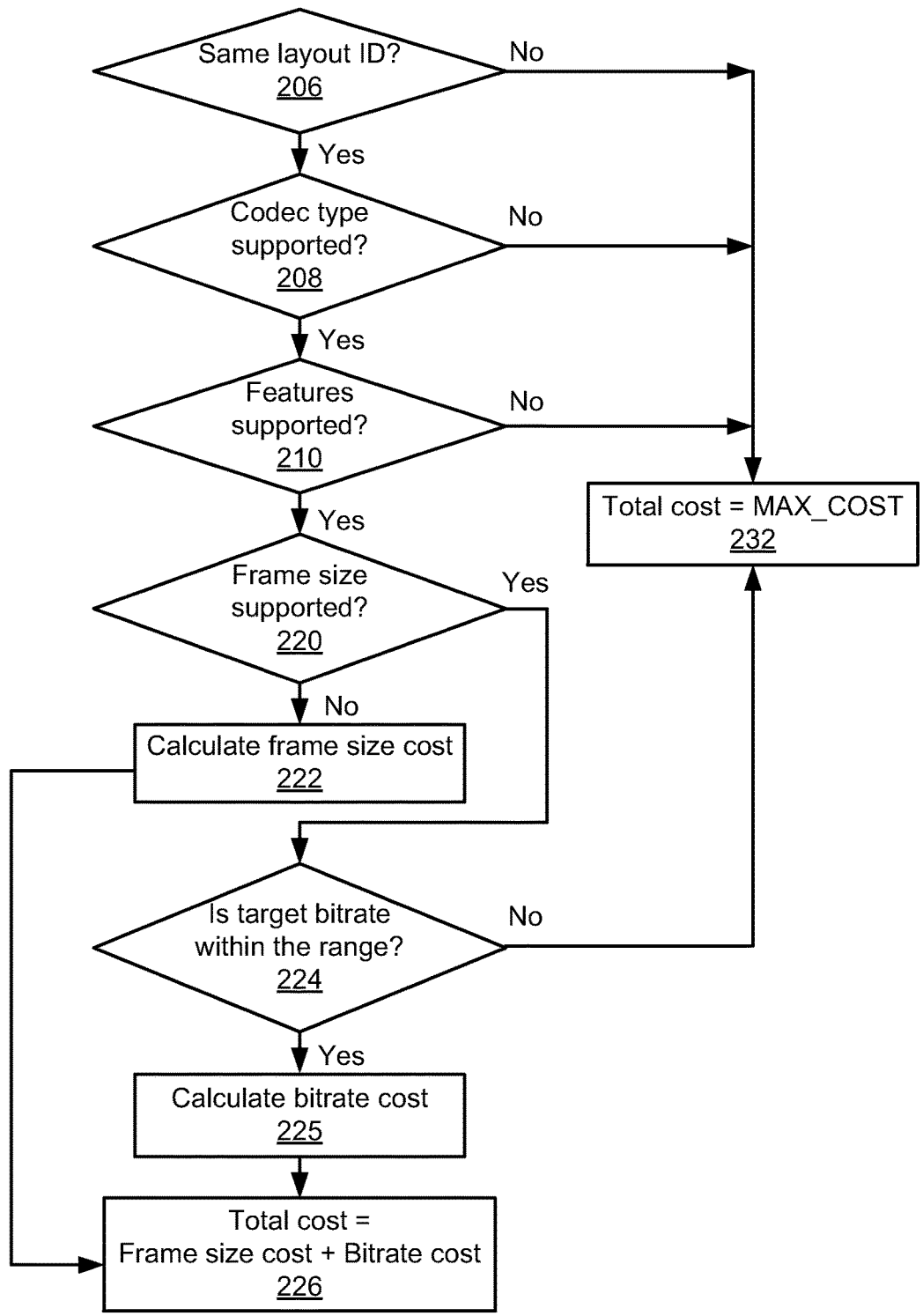
FIG. 2a is a flow diagram of a first exemplary method of the MCU of FIG. 1 for use in calculating the cost of sharing an existing video encoder.

FIG. 2a depicts an exemplary method of calculating a total cost of sharing an existing video encoder of the MCU 102 (also referred to herein as a/the "total video encoder sharing cost") with a respective one of the plurality of conference participant devices 106.1, 106.2, 106.3. If, for a particular video decoder associated with the respective conference participant device, the layout identifier (ID) (see block 206), the codec type (see block 208), and the specific features (e.g., architecture, clock speed, memory capacity, etc.) (see block 210) are determined not to be supported by the existing video encoder of the MCU 102, then the video encoder manager 112 assigns a predetermined maximum cost (also referred to herein as the "MAX_COST"; see block 232) to the total video encoder sharing cost, preventing the existing video encoder from subsequently being shared with the respective conference participant device (due to the high cost of sharing such an existing video encoder with the respective conference participant device).

If, for the particular video decoder associated with the respective conference participant device, the frame size is determined not to be supported by the existing video encoder of the MCU 102 (see block 220), then the video encoder manager 112 can calculate a cost associated with the difference in the frame sizes (also referred to herein as a/the "frame size difference cost") supported by the particular video decoder of the respective conference participant device and the existing video encoder of the MCU 102 (see block 222). In addition, if the target bitrate of the respective conference participant device is determined to be within a target bitrate range of the existing video encoder of the MCU 102 (see block 224), then the video encoder manager 112 can proceed to calculate a cost associated with the target bitrate (also referred to herein as a/the "target bitrate cost") (see block 225). The video encoder manager 112 can then calculate the total video encoder sharing cost (see block 226) as the sum of the frame size difference cost (as calculated in block 222) and the target bitrate cost (as calculated in block 225).

Otherwise, if the target bitrate of the respective conference participant device is determined not to be within the target bitrate range of the existing video encoder of the MCU 102, then the video encoder manager 112 assigns the MAX_COST (see block 232) to the total video encoder sharing cost. The video encoder manager 112 can repeat the exemplary method of FIG. 2a for some or all of the existing video encoders of the MCU 102, and select the existing video encoder that provides the lowest total video encoder sharing cost, i.e., the lowest cost of sharing the operations of the existing video encoder with the respective conference participant device.

Figure 2B:
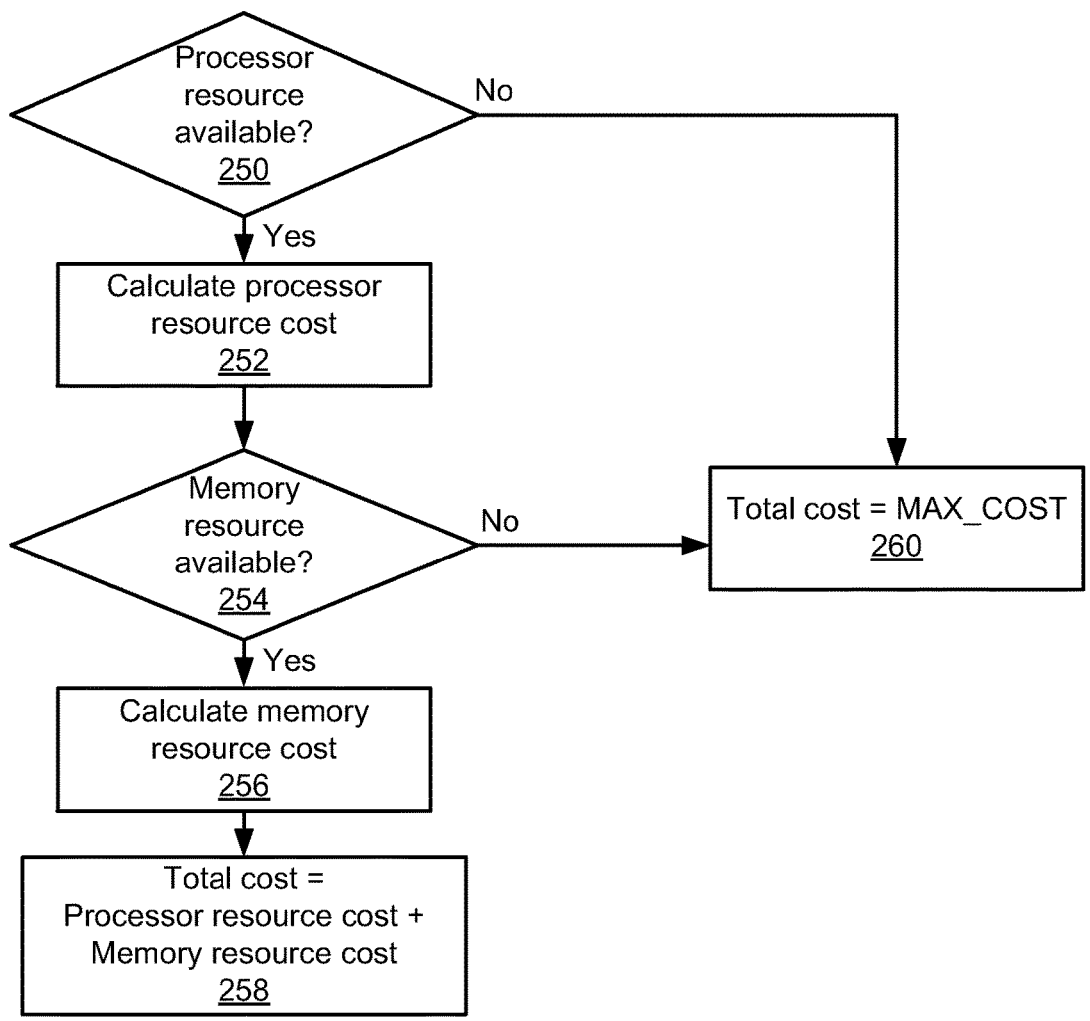
FIG. 2b is a flow diagram of a second exemplary method of the MCU of FIG. 1 for use in calculating the cost of creating an additional video encoder.

FIG. 2b depicts an exemplary method of calculating a total cost of allocating processor resources and/or memory resources to the creation or implementation of an additional video encoder of the MCU 102 (also referred to herein as a/the "total video encoder creation cost") for use by a respective one of the plurality of conference participant devices 106.1, 106.2, 106.3. As shown in FIG. 2b, the video encoder manager 112 determines the current availability of processor resources (e.g., the availability of resources of at least one central processing unit (CPU); see block 250) for the MCU 102, and calculates a cost of using such processor resources (also referred to herein as a/the "processor resource cost") (see block 252) for the creation or implementation of an additional video encoder for the respective conference participant device. Likewise, the video encoder manager 112 determines the current availability of memory resources (see block 254) for the MCU 102, and calculates a cost of using such memory resources (also referred to herein as a/the "memory resource cost") (see block 256) for the creation or implementation of the separate video encoder for the respective conference participant device.

If sufficient processor resources and/or memory resources are not currently available to the MCU 102 for the creation or implementation of an additional video encoder for use by the respective conference participant device, then the video encoder manager 112 assigns the MAX_COST (see block 260) to the total video encoder creation cost, preventing the separate video encoder from subsequently being created or implemented for the respective conference participant device (due to the lack of processor and/or memory resources required to create/implement such an additional video encoder for the respective conference participant device). Otherwise, the video encoder manager 112 calculates the total video encoder creation cost (see block 258) as the sum of the processor resource cost (as calculated in block 252) and the memory resource cost (as calculated in block 256).

If it is determined that the total video encoder sharing cost does not exceed the total video encoder creation cost, then the functionality of an existing video encoder of the MCU 102 can be shared between the respective conference participant device and one or more of the other conference participant devices 106.1, 106.2, and/or 106.3. Otherwise, if it is determined that the total video encoder sharing cost exceeds the total video encoder creation cost, then suitable processor and/or memory resources currently available to the MCU 102 can be used to create or implement an additional video encoder for use by the respective conference participant device.

It is noted that, when taking into account the codec type in the calculation of the total video encoder sharing cost (see block 208; FIG. 2a), the video encoder manager 112 can determine whether a video decoder of the respective conference participant device would be capable of decoding video bitstreams generated by an existing video encoder of the MCU 102. If it is determined that the video decoder of the respective conference participant device would be incapable of decoding such video bitstreams generated by the existing video encoder of the MCU 102, then the video encoder manager 112 can assign the MAX_COST (see block 232; FIG. 2a) to the existing video encoder of the MCU 102, preventing the existing video encoder from subsequently being shared with the respective conference participant device (due to the inability of such a video decoder of the respective conference participant device to decode video bitstreams generated by the existing video encoder of the MCU 102).

Further, when taking into account the layout ID in the calculation of the total video encoder sharing cost (see block 206; FIG. 2a), the video encoder manager 112 can determine whether the layout ID of the respective conference participant device conforms with that of the existing video encoder of the MCU 102. If it is determined that the layout ID of the respective conference participant device does not conform with that of the existing video encoder, then the video encoder manager 112 can avoid sharing the operations of the existing video encoder of the MCU 102 with the respective conference participant device.

Moreover, when taking into account the frame size supported by the respective conference participant device in the calculation of the total video encoder sharing cost (see block 220; FIG. 2a), if it is determined that the frame size supported by the respective conference participant device is different from that of the existing video encoder of the MCU 102, then the video encoder manager 112 can calculate the frame size difference cost, $Cost_{frame\_size}$, based upon the costs associated with the frame height, $Cost_{frame\_height}$, and the frame width, $Cost_{frame\_width}$, as follows:

$$Cost_{frame\_height} = \begin{cases} frame\_height_{input} - frame\_height_{existing} & \text{if } frame\_height_{input} > frame\_height_{existing} \\ w \times (frame\_height_{existing} - frame\_height_{input}) & \text{Otherwise} \end{cases} \quad (1)$$

$$Cost_{frame\_width} = \begin{cases} frame\_width_{input} - frame\_width_{existing} & \text{if } frame\_width_{input} > frame\_widht_{existing} \\ w \times (frame\_width_{existing} - frame\_width_{input}) & \text{Otherwise} \end{cases} \quad (2)$$

$$Cost_{frame\_size} = Cost_{frame\_height} + Cost_{frame\_width}. \quad (3)$$

In equations (1), (2), and (3), the "frame_height$_{input}$" and the "frame_width$_{input}$" correspond to the height and the width, respectively, of a video frame to be generated for the respective conference participant device. Further, the "frame_height$_{existing}$" and the "frame_width$_{existing}$" correspond to the height and the width, respectively, of a video frame generated by the existing video encoder of the MCU 102. In equations (1) and (2), a penalty is applied to the frame size difference cost if the frame size of the existing video encoder exceeds the frame size of the respective conference participant device by multiplying by a factor, w, which can be equal to 4 or any other suitable value.

When taking into account the target bitrate of the respective conference participant device in the calculation of the total video encoder sharing cost (see block 224; FIG. 2a), the video encoder manager 112 can verify the target bitrate of the respective conference participant device against the target bitrate range of the existing video encoder of the MCU 102. Further, the video encoder manager 112 can calculate a target bitrate cost based upon whether the target bitrate of the respective conference participant device falls within the operating target bitrate range of the existing video encoder of the MCU 102. A penalty can then be applied for sharing the operations of the existing video encoder of the MCU 102 with the respective conference participant device if the target bitrate of the respective conference participant device falls outside the target bitrate range supported by the existing video encoder.

Figure 3:
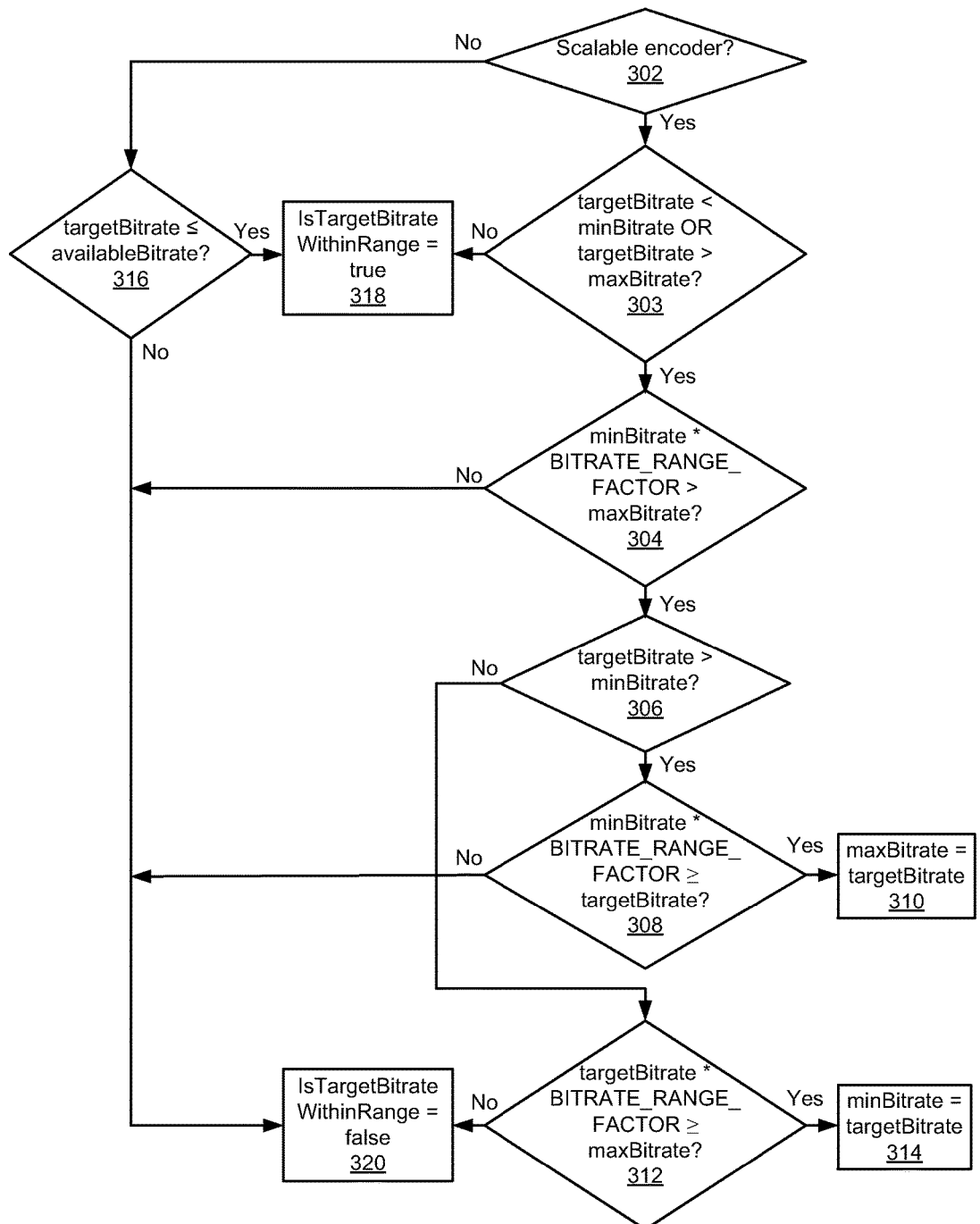
FIG. 3 is a flow diagram of a third exemplary method of the MCU of FIG. 1 for use in verifying a target bitrate of a conference participant device.

FIG. 3 depicts an exemplary method that can be performed by the video encoder manager 112 for verifying a target bitrate (also referred to herein as the "targetBitrate") of a respective conference participant device against a target bitrate range of an existing video encoder of the MCU 102. As depicted in block 302, a determination is made as to whether the existing video encoder of the MCU 102 is a scalable video encoder. In the event the existing video encoder is a scalable video encoder, a determination is made as to whether the targetBitrate is less than the minimum bitrate (also referred to herein as the "minBitrate") supported by the scalable video encoder, or whether the targetBitrate is greater than the maximum bitrate (also referred to herein as the "maxBitrate") supported by the scalable video encoder, as depicted in block 303. In the event the targetBitrate is less than the minBitrate supported by the scalable video encoder, or the targetBitrate is greater than the maxBitrate supported by the scalable video encoder, a determination is made as to whether the minBitrate supported by the scalable video encoder multiplied by a specified bitrate range factor (also referred to herein as the "BITRATE_RANGE_FACTOR") is higher than the maxBitrate supported by the scalable video encoder, as depicted in block 304. For example, the BITRATE_RANGE_FACTOR can be equal to 1.5 or any other suitable value. It is noted that the target bitrate range of the scalable video encoder is limited by the minBitrate and the maxBitrate for the purpose of maintaining a suitable tradeoff between compression efficiency and bitrate scalability.

In the event the minBitrate multiplied by the BITRATE_RANGE_FACTOR is not higher than the maxBitrate, a flag (denoted herein as "IsTargetBitrateWithinRange"), indicating whether the targetBitrate of the respective conference participant device is within the target bitrate range of the existing video encoder, can be set to "false", as depicted in block 320. In the event the minBitrate multiplied by the BITRATE_RANGE_FACTOR is higher than the maxBitrate, a determination is made as to whether the targetBitrate of the respective conference participant device is higher than the minBitrate supported by the scalable video encoder, as depicted in block 306.

In the event the targetBitrate of the respective conference participant device is higher than the minBitrate supported by the scalable video encoder, a determination is made as to whether the minBitrate multiplied by the BITRATE_RANGE_FACTOR is higher than or equal to the targetBitrate, as depicted in block 308. In the event the minBitrate multiplied by the BITRATE_RANGE_FACTOR is not higher than or equal to the targetBitrate, the flag, IsTargetBitrateWithinRange, can be set to "false", as depicted in block 320. In the event the minBitrate multiplied by the BITRATE_RANGE_FACTOR is higher than or equal to the targetBitrate, the maxBitrate supported by the scalable video encoder is set to be equal to the targetBitrate of the respective conference participant device, as depicted in block 310.

In the event the targetBitrate of the respective conference participant device is not higher than the minBitrate supported by the scalable video encoder, a determination is made as to whether the targetBitrate multiplied by the BITRATE_RANGE_FACTOR is higher than or equal to the maxBitrate supported by the scalable video encoder, as depicted in block 312. In the event the targetBitrate multiplied by the BITRATE_RANGE_FACTOR is not higher than or equal to the maxBitrate, the flag, IsTargetBitrateWithinRange, can be set to "false", as depicted in block 320. In the event the targetBitrate multiplied by the BITRATE_RANGE_FACTOR is higher than or equal to the maxBitrate, the minBitrate supported by the scalable video encoder is set to be equal to the targetBitrate of the respective conference participant device, as depicted in block 314.

In the event the existing video encoder is a non-scalable video encoder, a determination is made as to whether the targetBitrate of the respective conference participant device is lower than or equal to the bitrate available to the non-scalable video encoder (also referred to herein as the "availableBitrate"), as depicted in block 316. In the event the targetBitrate is not lower than or equal to the availableBitrate of the non-scalable video encoder, the flag, IsTargetBitrateWithinRange, can be set to "false", as depicted in block 320. In the event the targetBitrate is lower than or equal to the availableBitrate of the non-scalable video encoder, the flag, IsTargetBitrateWithinRange, can be set to "true", as depicted in block 318. Likewise, in the event the targetBitrate is not less than the minBitrate supported by the scalable video encoder, and the targetBitrate is not greater than the maxBitrate supported by the scalable video encoder, the flag, IsTargetBitrateWithinRange, can be set to "true", as depicted in block 318. It is noted that the functions depicted in blocks 310 and 314 operate to change (i.e., increase or decrease) the operating target bitrate range of the existing video encoder of the MCU 102, and do not operate to change the targetBitrate of the respective conference participant device.

If the targetBitrate of the respective conference participant device falls within the operating target bitrate range of the existing video encoder of the MCU 102, then the video encoder manager 112 can calculate a target bitrate cost, $Cost_{bitRate}$, for the respective conference participant device, as follows:

$$Cost_{bitRate} = \frac{(\max Bitrate \times CostMultiplier)}{\min Bitrate} - CostMultiplier. \quad (4)$$

In equation (4), the term, "CostMultiplier", can be expressed as follows:

$$CostMultiplier = \frac{MaxInRangeCost}{(BITRATE\_RANGE\_FACTOR - 1)}. \quad (5)$$

For example, in equation (5), the factor, "MaxInRangeCost", can be equal to 1000 or any other suitable value.

If the operating target bitrate range of the existing video encoder of the MCU 102 is increased, then an additional target bitrate cost can be applied for any conference participant device(s) that share the functionality of the existing video encoder with the respective conference participant device. For example, if (1) "N" conference participant devices share the existing video encoder of the MCU 102, (2) the target bitrate cost for the N conference participant devices before increasing the operating target bitrate range of the existing video encoder is designated as $Cost_{bitRate\_prev}$, and (3) the target bitrate cost for the N conference participant devices after increasing the operating target bitrate range of the existing video encoder is designated as $Cost_{bitRate\_new}$, then the video encoder manager 112 can calculate the total target bitrate cost, $Cost_{bitRate\_total}$, for the N conference participant devices, as follows:

$$Cost_{bitRate\_total} = N^*(Cost_{bitRate\_new} - Cost_{bitRate\_prev}) \quad (6)$$

If the targetBitrate of the respective conference participant device falls outside the operating target bitrate range of the existing video encoder of the MCU 102 after the operating target bitrate range is increased, then the video encoder manager 112 can apply a predetermined bitrate cost to the amount of the targetBitrate that falls outside the operating target bitrate range by multiplying by 256 or any other suitable value, as follows:

For targetBitrate>minBitrate, $$Cost_{bitRate} = \{MaxInRangeCost + \quad (7)$$
$$(targetBitrate - \min Bitrate \times BITRATE\_RANGE\_FACTOR) \times$$
$$256\}$$

else $$Cost_{bitRate} = \left\{MaxInRangeCost + \quad (8) \right.$$
$$\left. \left(\frac{\max Bitrate}{BITRATE\_RANGE\_FACTOR} - targetBitrate\right) \times 256 \right\}.$$

In the event the existing video encoder of the MCU 102 is a non-scalable video encoder, the video encoder manager 112 can calculate the target bitrate cost, $Cost_{bitRate}$, for the respective conference participant device, as follows:

$$Cost_{bitRate} = \frac{abs(targetBitrate - availableBitrate)}{\max(targetBitrate, availableBitrate)} \times MaxInRangeCost, \quad (9)$$

in which "availableBitrate" corresponds to the available bit rate of the non-scalable video encoder.

With regard to the memory resource cost for creating an additional video encoder of the MCU 102, the video encoder manager 112 can calculate a usage, x, of memory resources (e.g., in percentage) associated with the MCU 102, and then calculate an additional amount of usage, y, of memory resources of the MCU 102 that would be required if such memory resources were allocated for creating the separate video encoder. The video encoder manager 112 can calculate the memory resource cost for a current level of resource usage (also referred to herein as "$cost_{current}$"), as follows:

$$cost_{current} = \begin{cases} A \times x & x < 50 \\ (A \times 50) + B \times (x - 50) & 50 \leq x < 80 \\ (A \times 50) + B \times 30 + C \times (x - 80) & 80 \leq x < 90 \\ Max & x > 90 \end{cases}, \quad (10)$$

in which the maximum resource cost, "Max", can be equal to 100 or any other suitable value. It is noted that the function for calculating the memory resource cost for a current level of resource usage (cost$_{current}$), as expressed in equation (10), is disclosed herein for the purpose of illustration, and that any other suitable function may be employed.

The video encoder manager 112 can further calculate the memory resource cost after allocating the memory resources for creating the separate video encoder (also referred to herein as the "cost$_{after}$") using equation (10), but replacing "x" with "x+y". The video encoder manager 112 can then calculate the memory resource cost for the separate video encoder as the difference between the cost$_{after}$ and the cost$_{current}$.

With regard to the processor resource cost for creating an additional video encoder of the MCU 102, the video encoder manager 112 can likewise calculate, using equation (10), a usage, x, of processor resources (e.g., in percentage) associated with the MCU 102, and then calculate an additional amount of usage, y, of processor resources of the MCU 102 that would be required if such processor resources were allocated for operating the additional video encoder. The video encoder manager 112 can further calculate the processor resource cost after allocating the processor resources for operating the additional video encoder (cost$_{after}$) using equation (10), but replacing "x" with "x+y". The video encoder manager 112 can then calculate the processor resource cost for the additional video encoder as the difference between the cost$_{after}$ and the cost$_{current}$.

The total memory/processor resource cost of allocating processor/memory resources for an additional video encoder of the MCU 102 can be expressed as the sum of the memory resource cost and the processor resource cost. If there are sufficient memory/processor resources currently available to the MCU 102 for creating or implementing the additional video encoder, then a higher cost can be applied to the sharing of an existing video encoder of the MCU 102. Otherwise, if there are insufficient processor/memory resources currently available to the MCU 102 for creating or implementing the additional video encoder, then a lower cost can be applied to the sharing of an existing video encoder of the MCU 102.

It is noted that the video encoder manager 112 can estimate the amount of processor resources required for operating a newly created video encoder of the MCU 102 by continuously determining/updating a current CPU load for the MCU 102. Such a current CPU load can correspond to the CPU load required to run a video encoder having a specific resolution, bitrate, and/or frame rate. If the additional video encoder to be created for the respective conference participant device requires a different resolution, bitrate, and/or frame rate, then the video encoder manager 112 can calculate one or more scaling factors based upon the resolution, bitrate, and/or frame rate, and estimate the CPU load for the additional video encoder by multiplying the current CPU load by the respective scaling factor(s).

Such scaling factors for the frame size (also referred to herein as the "scale$_{framesize}$"), the frame rate (also referred to herein as the "scale$_{frameRate}$"), and the bitrate (also referred to herein as the "scale$_{bitRate}$") can be calculated, as follows:

$$scale_{frameSize} = 0.7 + 0.3 \times \left(\frac{1}{frameSizeRatio}\right)^{1.1}, \quad (11)$$

$$scale_{frameRate} = 0.5 + 0.5 \times \left(\frac{1}{frameRateRatio}\right)^{1.2}, \text{ and} \quad (12)$$

-continued $$scale_{bitRate} = 0.9 + 0.1 \times \left(\frac{1}{bitRateRatio}\right)^{1.05}. \quad (13)$$

The total scaling factor (also referred to herein as the "scale$_{factor}$") can then be calculated as the product of the scale$_{frameSize}$, the scale$_{frameRate}$, and the scale$_{bitRate}$, as follows:

$$scale_{factor} = scale_{frameSize} \times scale_{frameRate} \times scale_{bitRate}. \quad (14)$$

It is noted that the functions for calculating the frame size (scale$_{framesize}$), the frame rate (scale$_{frameRate}$), the bitrate (scale$_{bitRate}$), and the total scaling factor (scale$_{factor}$), as expressed in equations (11), (12), (13), and (14), respectively, are disclosed herein for purposes of illustration, and that any other suitable functions may be employed.

Using the scale$_{factor}$, as expressed in equation (14), the video encoder manager 112 can calculate the current CPU load (the "CPULoad"), as follows:

$$CPULoad = \sum_{i=1}^{N} EncLoad(i) + \sum_{i=1}^{M} DecLoad(i), \text{ or} \quad (15a)$$

$$CPULoad = \sum_{i=1}^{n} scale_{factor(refEnc)\_i} * refEncLoad + \quad (15b)$$

$$\sum_{i=1}^{M} scale_{factor(refDec)\_i} * refDecLoad,$$

in which "refEncLoad" corresponds to a portion of the CPU load attributable to a reference video encoder, "refDecLoad" corresponds to a portion of the CPU load attributable to a reference video decoder, and "N" and "M" are positive integers.

For example, if there are a plurality of video decoders (e.g., 2) and a single video encoder (e.g., 1) contributing to the current CPU load, then equation (15b) can be expressed (after setting M equal to "2", and N equal to "1"), as follows:

$$CPULoad = (scale_{factor(refEnc)\_1} \times refEncLoad) + (scale_{factor(refDec)\_1} \times refDecLoad) + (scale_{factor(refDec)\_2} \times refDecLoad) \quad (16)$$

Accordingly, using, for example, a video decoder-to-video encoder load ratio of 4, equation (16) can be expressed as follows:

$$CPULoad = (scale_{factor(refEnc)\_1} \times refEncLoad) + \quad (17)$$
$$\left(scale_{factor(refDec)\_1} \times \frac{refEncLoad}{4}\right) +$$
$$\left(scale_{factor(refDec)\_2} \times \frac{refEncLoad}{4}\right)$$

or $$CPULoad = refEncLoad \quad (18)$$
$$\left(scale_{factor(refEnc)\_1} + \frac{scale_{factor(refDec)\_1}}{4} + \frac{scale_{factor(refDec)\_2}}{4}\right).$$

Accordingly, the video encoder manager 112 can calculate the scaling factor for the single reference video encoder, namely, "scale$_{factor(refEnc)\_1}$", and the scaling factors for the two reference video decoders, namely, "scale$_{factor(refDec)\_1}$" and "scale$_{factor(refDec)\_2}$", and determine the current CPU load (CPULoad) using equation (18). Further, when the CPU load of an existing video encoder of the MCU 102 is to be estimated for a respective conference participant device, the video encoder manager 112 can calculate the total scaling factor, $scale_{factor}$, using equation (14), by obtaining the product of the respective scaling factors $scale_{frameSize}$, $scale_{frameRate}$, and $scale_{bitRate}$, resulting from equations (11), (12), and (13), respectively. For example, if the frame size of the respective conference participant device were determined to be the same as the frame size supported by the reference video encoder, then the scaling factor, $scale_{frameSize}$, obtained from equation (11), would be equal to one, indicating that no scaling of the frame size is required. Further, if the resolution of the respective conference participant device were higher than that of the reference video encoder, then the scaling factor, $scale_{frameSize}$, obtained from equation (11), would be greater than one, indicating that such scaling of the frame size is required.

Figure 4:
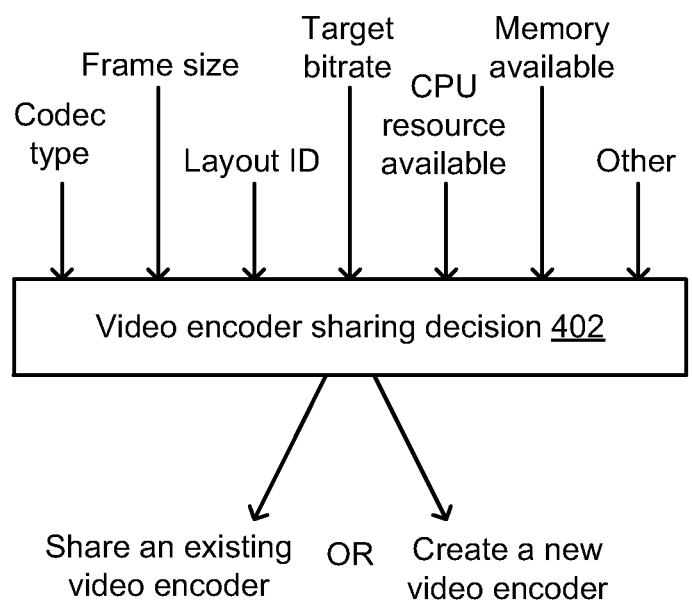
FIG. 4 is a diagram illustrating various exemplary parameters involved in making decisions regarding the sharing and/or creation of video encoders associated with the MCU of FIG. 1.

FIG. 4 illustrates the various exemplary parameters involved in making decisions regarding the sharing of video encoders associated with the MCU 102 (see FIG. 1). As described herein, the total video encoder sharing cost for a particular existing video encoder of the MCU 102, resulting from a respective conference participant device 106.1, 106.2, or 106.3 joining a video conference, can be a combination of the frame size difference cost and the target bitrate cost. The video encoder manager 112 can calculate the total video encoder sharing cost associated with each of the existing video encoders of the MCU 102, and then select the existing video encoder having the lowest total video encoder sharing cost. It is noted that the video encoder manager 112 can further calculate the total video encoder creation cost as a combination of the processor resource cost and the memory resource cost.

Systems and methods of handling packet errors in multimedia communications systems are further disclosed, in which a plurality of multimedia participant devices, such as a plurality of conference participant devices, can share the same video encoder of an MCU, depending upon at least the current availability of processor resources and/or memory resources for the MCU. In such systems and methods, the MCU can send, in a real-time transport protocol (RTP) session, a plurality of multimedia streams to the plurality of multimedia participant devices, respectively. Further, at least a respective one of the plurality of multimedia participant devices can, at least at some times, provide packet error feedback information to the MCU in one or more RTCP feedback packets. For example, the packet error feedback information can include at least a Picture Loss Indication (PLI) message, an RTCP feedback packet such as an RTCP receiver estimated maximum bitrate (REMB) packet (also referred to herein as an/the "REMB message"), and/or a General Negative Acknowledgment (GNACK) message.

Having received the packet error feedback information from the respective multimedia receiver, the MCU can generate and send an I-frame over a transmission path to the receiving side of the RTP session (assuming, for example, that such packet error feedback information includes at least a PLI message), depending upon at least a cost associated with providing the I-frame (also referred to herein as a/the "I-frame cost") to the other multimedia receiver(s) that share the same video encoder as the respective multimedia receiver. Further, the MCU can adjust the average bitrate employed in the RTP session to be equal to or lower than an estimated available bitrate for the respective multimedia receiver (assuming, for example, that such packet error feedback information includes at least an REMB message), based at least upon the estimated available bitrate for the respective multimedia receiver, a maximum available bitrate among available bitrates for the plurality of multimedia participant devices, and/or a minimum available bitrate among the available bitrates for the plurality of multimedia participant devices.

By taking into account (1) the I-frame cost associated with providing an I-frame to the other multimedia receiver(s) before sending the I-frame over the transmission path to the receiving side of the RTP session, and/or (2) the estimated available bitrate for the respective multimedia receiver, the maximum available bitrate among available bitrates for the plurality of multimedia participant devices, and/or the minimum available bitrate among the available bitrates for the plurality of multimedia participant devices before adjusting the average bitrate employed in the RTP session, the MCU can provide an appropriate reaction to the packet error feedback information provided by the respective multimedia receiver. In this way, an improved average quality of experience (QoE) for multimedia transmissions to the plurality of multimedia participant devices that share the same video encoder of the MCU can be achieved.

Figure 5:
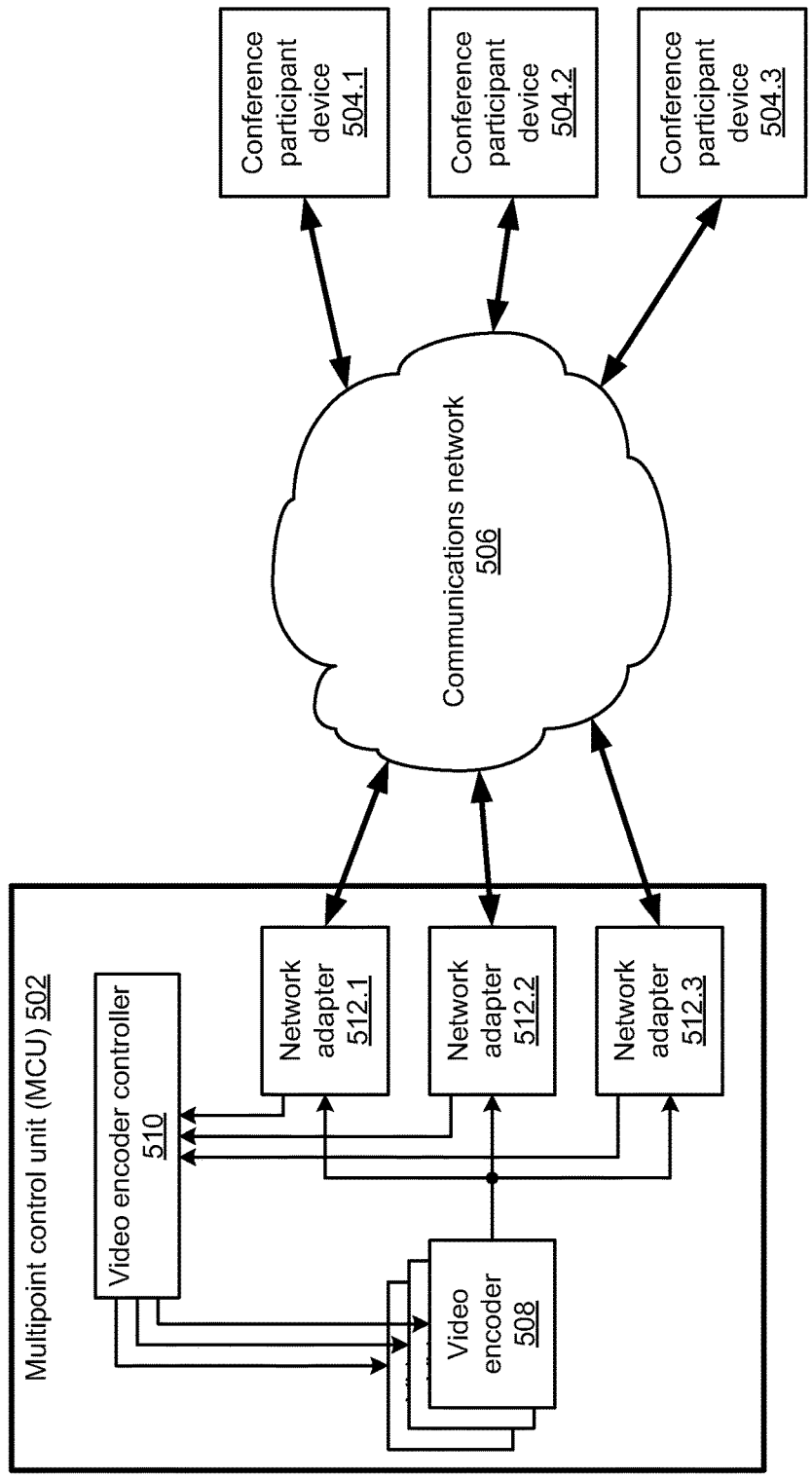
FIG. 5 is a block diagram of another exemplary video conferencing system, including an exemplary MCU configured to share one or more video encoders among a plurality of exemplary conference participant devices.

FIG. 5 depicts an exemplary multimedia communications system, such as a video conferencing system 500, which includes an exemplary MCU 502 configured to share one or more video encoders among a plurality of exemplary multimedia participant devices, such as a plurality of conference participant devices 504.1, 504.2, 504.3, depending upon at least the current availability of processor resources and/or memory resources for the MCU 502, in accordance with the present application.

As shown in FIG. 5, the respective conference participant devices 504.1, 504.2, 504.3 are each communicably coupleable to the MCU 502 over a wired and/or wireless communications network 506, such as a packet communications network or any other suitable network. The MCU 502 includes at least one video encoder 508, a video encoder controller 510, and a plurality of network adapters 512.1, 512.2, 512.3. The video conferencing system 500 is operative to perform multimedia transmissions based upon the RTP, and to monitor delivery of multimedia data using the RTCP. For example, by way of the plurality of network adapters 512.1, 512.2, 512.3, the MCU 502 can send such multimedia data to the plurality of conference participant devices 504.1, 504.2, 504.3 in the form of RTP packets (e.g., video, audio, and/or data packets), and the plurality of conference participant devices 504.1, 504.2, 504.3 can each provide packet error feedback information to the MCU 502 in the form of RTCP feedback packets (e.g., RTCP sender report (SR) packets or RTCP receiver report (RR) packets).

The packet error feedback information received at the MCU 502 from a respective one of the conference participant devices 504.1, 504.2, 504.3 (also referred to herein as a/the "respective conference participant device") can include, but is not limited to, a PLI message, an REMB message, and/or a GNACK message. For example, such a PLI message may be provided to the MCU 502 by the respective conference participant device to indicate the loss of an unspecified amount of packets, and to request the MCU 502 to transmit or send an I-frame. Further, such an REMB message may be provided by the respective conference participant device to notify the MCU 502 of the estimated available bitrate on a transmission path to the respective conference participant device. In addition, such a GNACK message may be provided to the MCU 502 by the respective conference participant device to identify specific packets that have been detected as being lost, and to request the MCU 502 to retransmit or resend the specific identified packets.

In an exemplary mode of operation, prior to the possible generation and transmission of an I-frame in response to a PLI message provided by the respective conference participant device, the video encoder controller 510 calculates, determines, or otherwise obtains an initial I-frame cost, $C_{I\_frame}$, and a total I-frame cost, $TC_{I\_frame}$, associated with sending the I-frame over the transmission path to the receiving side of the RTP session, thereby providing the I-frame not only to the respective conference participant device, but also to the other conference participant device(s) 504.1, 504.2, and/or 504.3 sharing the operations of the same video encoder (e.g., the video encoder 508) as the respective conference participant device. The initial I-frame cost, $C_{I\_frame}$, is expressed herein as an initial I-frame cost function, f( . . . ), of several specified cost factors, as follows:

$$C_{I\_frame} = f(R_{bits\_IP}, K), \quad (19)$$

in which "$R_{bits\_IP}$" corresponds to the number of additional bits that would be required to encode a current video frame using intra-coding as opposed to using inter-coding, and "K" corresponds to the total number of other conference participant device(s) sharing the operations of the same video encoder 508 as the respective conference participant device. For example, the term "$R_{bits\_IP}$" can be calculated, as follows:

$$R_{bits\_IP} = \frac{B_{I\_frame}}{B_{P\_frame}}, \quad (20)$$

in which "$B_{I\_frame}$" corresponds to the average number of bits that would be required to encode the current video frame as an I-frame, and "$B_{P\_frame}$" corresponds to the average number of bits that would be required to encode the current video frame as a predicted frame (also referred to herein as a/the "P-frame"). It is noted that the number of additional bits that would be required to encode the current video frame using intra-coding as opposed to using inter-coding, as expressed in equation (20) as $R_{bits\_IP}$, is typically larger for multimedia content that contains less motion.

In this exemplary mode of operation, the initial I-frame cost function, f( . . . ) (see equation (19)), is expressed as an increasing function of each of its specified cost factors, $R_{bits\_IP}$ and K, resulting in an increase in the initial I-frame cost, $C_{I\_frame}$, as the number of additional bits required to encode the current video frame using intra-coding increases (i.e., as $R_{bits\_IP}$ increases), and as the total number, K, of other conference participant device(s) sharing the operations of the same video encoder 508 as the respective conference participant device increases. For example, the initial I-frame cost function, f( . . . ), can be expressed as a piecewise linear function, as follows:

$$C_{I\_frame} = \begin{cases} 0.0 & \text{if} \quad R_{bits\_IP} < 1.0 \\ K \times (R_{bits\_IP} - 1.0) & \text{elseif} \quad R_{bits\_IP} < 8.0 \\ K \times 7 & \text{Otherwise} \end{cases} \quad (21)$$

It is noted that the piecewise linear function expressed in equation (21) is disclosed herein for the purpose of illustration, and that any other suitable function may be employed.

With further regard to this exemplary mode of operation, the total I-frame cost, $TC_{I\_frame}$, is expressed herein as a total I-frame cost function, g( . . . ), of several specified cost factors, as follows:

$$TC_{I\_frame} = g(C_{I\_frame}, N_{next\_I}), \quad (22)$$

in which "$N_{next\_I}$" corresponds to the number of inter-coded frames, such as P-frames and/or bidirectional predicted frames (also referred to herein as "B-frames"), scheduled to be transmitted or sent over the transmission path to the receiving side of the RTP session before sending the next scheduled I-frame. Such a number, $N_{next\_I}$, is also referred to herein as a/the "distance to the next scheduled I-frame". In effect, the total I-frame cost function, g( . . . ), as expressed in equation (22), weights the initial I-frame cost, $C_{I\_frame}$, by the distance to the next scheduled I-frame, $N_{next\_I}$.

In this exemplary mode of operation, the total I-frame cost function, g( . . . ) (see equation (22)), is expressed as an increasing function of each of its several specified cost factors, $C_{I\_frame}$ and $N_{next\_I}$, resulting in an increase in the total I-frame cost, $TC_{I\_frame}$, as the initial I-frame cost, $C_{I\_frame}$, increases, and as the distance to the next scheduled I-frame, $N_{next\_I}$, increases. For example, the total I-frame cost function, g( . . . ), can be expressed as a piecewise linear function, as follows:

$$TC_{I\_frame} = \begin{cases} C_{I\_frame} & \text{if} \quad N_{next\_I} < 6 \\ C_{I\_frame} \times \sqrt{N_{next\_I} - 4} & \text{elseif} \quad N_{next\_I} < 68 \\ C_{I\_frame} \times 8 & \text{Otherwise} \end{cases} \quad (23)$$

It is noted that the piecewise linear function expressed in equation (23) is disclosed herein for the purpose of illustration, and that any other suitable function may be employed.

Based at least upon the initial I-frame cost, $C_{I\_frame}$, and the distance to the next scheduled I-frame, $N_{next\_I}$, the MCU 502 can determine to take one of several exemplary actions in response to a PLI message, including (1) generate and send the I-frame substantially immediately, (2) ignore the request from the respective conference participant device to send the I-frame, and (3) create an additional video encoder (or designate an existing video encoder) that is not shared with any of the other conference participant device(s) 504.1, 504.2, and/or 504.3 for use by the respective conference participant device.

Figure 6:
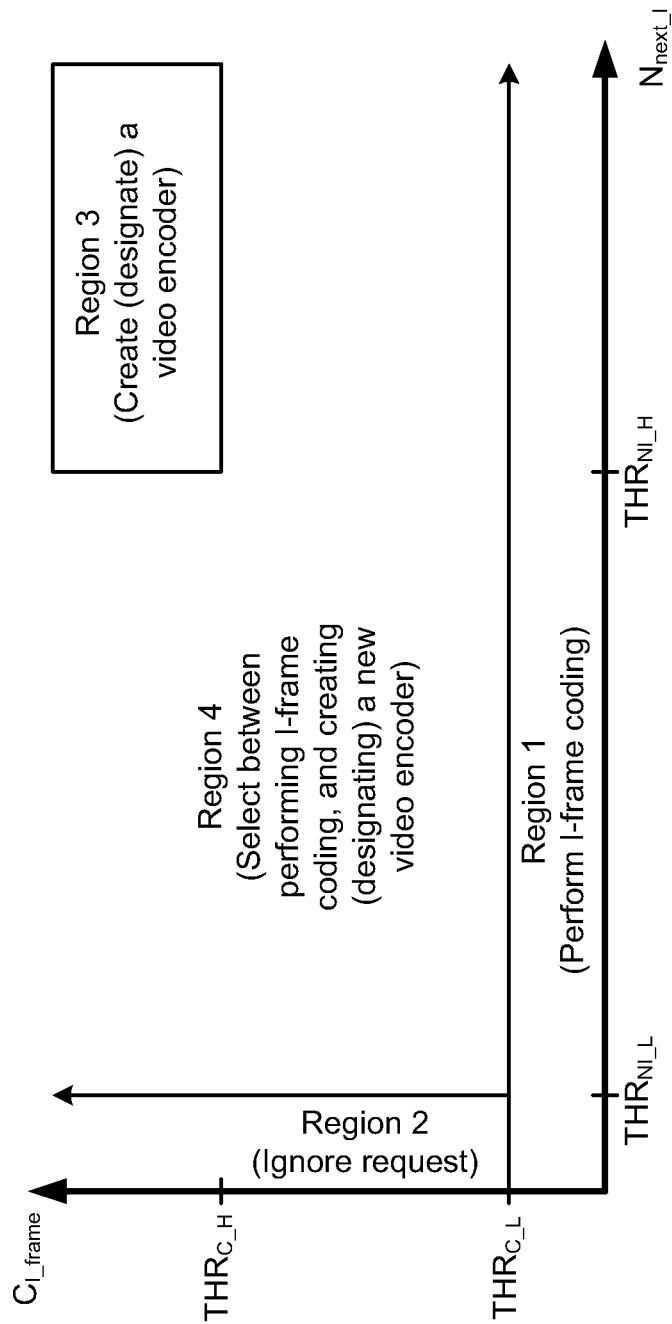
FIG. 6 is a graph illustrating a plurality of exemplary actions that the MCU of FIG. 5 can take in response to a Picture Loss Indication (PLI) message from a respective one of the plurality of conference participant devices of FIG. 5.

The three exemplary actions (1) through (3) that the MCU 502 can take in response to a PLI message from the respective conference participant device will be further understood with reference to FIG. 6, which depicts four Regions 1 through 4 of a graph 600, namely, Region 1 (Perform I-frame coding), Region 2 (Ignore request), Region 3 (Create (designate) a video encoder), and Region 4 (Select between performing I-frame coding, and creating (designating) a video encoder). As shown in FIG. 6, the Regions 1 through 4 are defined in relation to the initial I-frame cost, $C_{I\_frame}$, on a vertical axis of the graph 600, and the distance to the next scheduled I-frame, $N_{next\_I}$, on a horizontal axis of the graph 600.

Several predetermined threshold values for the initial I-frame cost, $C_{I\_frame}$, are marked on the vertical axis of the graph 600, namely, a predetermined threshold value, $THR_{C\_L}$, and a predetermined threshold value, $THR_{C\_H}$. For example, the predetermined threshold values, $THR_{C\_L}$ and $THR_{C\_H}$, can be set to "1.5" and "4", respectively, or any other suitable values. Likewise, several predetermined threshold values for the distance to the next scheduled I-frame, $N_{next\_I}$, are marked on the horizontal axis of the graph 600, namely, a predetermined threshold value, $THR_{NI\_L}$, and a predetermined threshold value, $THR_{NI\_H}$. For example, the predetermined threshold values, $THR_{NI\_L}$ and $THR_{NI\_H}$, can be set to "4" and "30", respectively, or any other suitable values.

Accordingly, in the event the initial I-frame cost, $C_{I\_frame}$, is determined to be less than the predetermined threshold value, $THR_{C\_L}$, the MCU 502 can determine to take the first exemplary action corresponding to Region 1 (Perform I-frame coding) of the graph 600, i.e., generate and send the I-frame substantially immediately. In the event the initial I-frame cost, $C_{I\_frame}$, is determined to be greater than or equal to the predetermined threshold value, $THR_{C\_L}$, but the distance to the next scheduled I-frame, $N_{next\_I}$, is determined to be less than $THR_{NI\_L}$, the MCU 502 can determine to take the second exemplary action corresponding to Region 2 (Ignore request) of the graph 600, i.e., ignore the request from the respective conference participant device to send the I-frame. In the event the initial I-frame cost, $C_{I\_frame}$, is determined to be greater than the predetermined threshold value, $THR_{C\_H}$, and the distance to the next scheduled I-frame, $N_{next\_I}$, is determined to be greater than $THR_{NI\_H}$, the MCU 502 can determine to take the third exemplary action corresponding to Region 3 (Create (designate) a video encoder) of the graph 600, i.e., create an additional video encoder (or designate an existing video encoder) that is not shared with any of the other conference participant device(s) 504.1, 504.2, and/or 504.3 for use by the respective conference participant device.

In the event the coordinates ($N_{next\_I}$, $C_{I\_frame}$) do not fall within any of Regions 1 to 3, but fall within Region 4, the MCU 502 can select between the first exemplary action (Perform I-frame coding) and the third exemplary action (Create (designate) a video encoder). In the event the total I-frame cost, $TC_{I\_frame}$, is determined to be less than a predetermined threshold value, $THR_{TC}$ (not shown in the graph 600), the MCU 502 can make the selection of generating and sending the I-frame immediately. Otherwise, in the event the total I-frame cost, $TC_{I\_frame}$, is determined to be greater than or equal to the predetermined threshold $THR_{TC}$, the MCU 502 can make the selection of creating an additional video encoder (or designating an existing video encoder) that is not shared with any of the other conference participant device(s) 504.1, 504.2, and/or 504.3 for use by the respective conference participant device. For example, the predetermined threshold value, $THR_{TC}$, can be set to 16, or any other suitable value.

It is noted that, while determining whether to create or designate a video encoder, the MCU 502 can take into account the average value of a quantization parameter (QP) used by the video encoder 508 to encode multimedia content for transmission to the plurality of conference participant devices 504.1, 504.2, 504.3. Such an average value of the QP can provide an indication of the complexity, such as the space complexity and/or the time complexity, of the multimedia content. For example, the complexity of the multimedia content can depend upon whether its background content is simple or complex, whether there is a high level of motion (or little or no motion) in the multimedia content, the activity and/or texture associated with the multimedia content, etc.

If the average value of the QP indicates that an acceptable QoE for multimedia transmissions can be achieved with increased intra-coding of video frames in the multimedia content, then the MCU 502 can determine to select the action of performing of I-frame coding. Otherwise, if the average value of the QP indicates that an acceptable QoE for multimedia transmissions would not be achieved with increased intra-coding of the video frames in the multimedia content, then the MCU 502 can determine to select the action of creating (designating) a video encoder.

In this exemplary mode of operation, the complexity of the multimedia content can be expressed as a function of the QP, depending upon at least the video format implemented by the video encoder 508. For example, if the video encoder 508 is configured to implement the H.264 video format, then the complexity, $E_{H.264}$, of the multimedia content can be expressed as a piecewise linear function of the QP, as follows:

$$E_{H.264} = \begin{cases} 0.0 & \text{if} \quad QP < 15 \\ (QP-15)/10.0 & \text{elseif} \quad QP < 24 \\ 1.0 & \text{Otherwise} \end{cases} \quad (24)$$

Further, if the video encoder 508 is configured to implement the VP8 video format, then the complexity, $E_{VP8}$, of the multimedia content can likewise be expressed as a piecewise linear function of the QP, as follows:

$$E_{VP8} = \begin{cases} 0.0 & \text{if} \quad QP < 8 \\ (QP-8)/16.0 & \text{elseif} \quad QP < 24 \\ 1.0 & \text{Otherwise} \end{cases} \quad (25)$$

It is noted that the piecewise linear functions expressed in equations (24) and (25) are disclosed herein for purposes of illustration, and that any other suitable functions may be employed.

With further regard to this exemplary mode of operation, the video encoder controller 510 can multiply the initial I-frame cost, $C_{I\_frame}$, by the complexity of the multimedia content (e.g., $E_{H.264}$ or $E_{VP8}$) before the MCU 502 makes the determination of which action to take in response to a PLI message from the respective conference participant device. Alternatively, the MCU 502 can determine to take the first exemplary action in response to the PLI message, i.e., generate and send the I-frame substantially immediately, if the initial I-frame cost, $C_{I\_frame}$, is determined to be less than the predetermined threshold value, $THR_{C\_L}$, or if the complexity of the multimedia content (e.g., $E_{H.264}$ or $E_{VP8}$) is determined to be less than a predetermined threshold value, $THR_E$. For example, the predetermined threshold value, $THR_E$, can be set to "0.6", or any other suitable value.

It is noted that, by creating an additional video encoder (or designating an existing video encoder) for use by the respective conference participant device, the MCU 502 can generate and send the requested I-frame over the transmission path to the respective conference participant device, while avoiding the potentially high cost of providing the I-frame to the other conference participant device(s) 504.1, 504.2, and/or 504.3 that previously shared the same video encoder with the respective conference participant device. Further, following the transmission of the next or other subsequent scheduled I-frame by the MCU 502, the respective conference participant device can return to sharing the operations of the same video encoder with the other conference participant device(s) 504.1, 504.2, and/or 504.3.

In this exemplary mode of operation, prior to the possible adjustment of the average bitrate employed in the RTP session in response to an REMB message provided by the respective conference participant device, the video encoder controller 510 determines or otherwise obtains the current bitrate (also referred to herein as "$B_{encoder}$") for the video encoder 508, the estimated available bitrate (also referred to herein as "$B_{user}$") for the respective conference participant device, the maximum available bitrate (also referred to herein as "$B_{max}$") among available bitrates for the plurality of conference participant devices 504.1, 504.2, 504.3, and/or the minimum available bitrate (also referred to herein as "$B_{min}$") among the available bitrates for the plurality of conference participant devices 504.1, 504.2, 504.3.

In the event the estimated available bitrate, $B_{user}$, for the respective conference participant device (e.g., as obtained by the MCU 502 from the REMB message) calls for an increase in the current bitrate, $B_{encoder}$, for the video encoder 508, the video encoder controller 510 compares the estimated available bitrate, $B_{user}$, for the respective conference participant device with the minimum available bitrate, $B_{min}$, for the plurality of conference participant devices 504.1, 504.2, 504.3. If the estimated available bitrate, $B_{user}$, for the respective conference participant device is lower than the minimum available bitrate, $B_{min}$, for the plurality of conference participant devices 504.1, 504.2, 504.3, then the video encoder controller 510 sets the bitrate, $B_{encoder}$, for the video encoder 508 to be equal to the estimated available bitrate, $B_{user}$, for the respective conference participant device, as follows:

$$B_{encoder} = B_{user} \text{ if } B_{user} < B_{min}. \tag{26}$$

Otherwise, if the estimated available bitrate, $B_{user}$, for the respective conference participant device is higher than the minimum available bitrate, $B_{min}$, for the plurality of conference participant devices 504.1, 504.2, 504.3, but lower than the maximum available bitrate, $B_{max}$, for the plurality of conference participant devices 504.1, 504.2, 504.3 multiplied by a predetermined factor, $\alpha$ (e.g., "$\alpha$" can be equal to 1.1, or any other suitable value), then the video encoder controller 510 sets the bitrate, $B_{encoder}$, for the video encoder 508 to be equal to the minimum available bitrate, $B_{min}$, for the plurality of conference participant devices 504.1, 504.2, 504.3, as follows:

$$B_{encoder} = B_{min} \text{ if } B_{user} < \alpha^* B_{max}. \tag{27}$$

Moreover, if the estimated available bitrate, $B_{user}$, for the respective conference participant device is higher than the maximum available bitrate, $B_{max}$, for the plurality of conference participant devices 504.1, 504.2, 504.3 multiplied by the predetermined factor, $\alpha$, then the video encoder controller 510 determines whether setting the bitrate, $B_{encoder}$, for the video encoder 508 to be equal to the minimum available bitrate, $B_{min}$, would be expected to result in an acceptable QoE for multimedia transmissions to the plurality of conference participant devices 504.1, 504.2, 504.3, using any suitable technique known in the art. If it is determined that setting the bitrate, $B_{encoder}$, for the video encoder 508 to be equal to the minimum available bitrate, $B_{min}$, would be expected to result in an acceptable QoE for such multimedia transmissions, then the video encoder controller 510 sets the bitrate, $B_{encoder}$, for the video encoder 508 to be equal to the minimum available bitrate, $B_{min}$, for the plurality of conference participant devices 504.1, 504.2, 504.3, as follows:

$$B_{encoder} = B_{min} \text{ if } B_{min} \text{ would result in an acceptable QoE}. \tag{28}$$

Otherwise, if it is determined that setting the bitrate, $B_{encoder}$, for the video encoder 508 to be equal to the minimum available bitrate, $B_{min}$, would not be expected to result in an acceptable QoE for such multimedia transmissions, then the MCU 502 creates an additional video encoder (or designates an existing video encoder) for use by the respective conference participant device.

In the event the estimated available bitrate, $B_{user}$, for the respective conference participant device (e.g., as obtained by the MCU 502 from the REMB message) calls for a decrease in the current bitrate, $B_{encoder}$, for the video encoder 508, the video encoder controller 510 compares the estimated available bitrate, $B_{user}$, for the respective conference participant device with the current bitrate, $B_{encoder}$, for the video encoder 508. If the estimated available bitrate, $B_{user}$, for the respective conference participant device is higher than the current bitrate, $B_{encoder}$, for the video encoder 508, then the video encoder controller 510 maintains the current setting of the bitrate, $B_{encoder}$, for the video encoder 508, as follows:

$$B_{encoder} = B_{encoder} \text{ if } B_{user} > B_{encoder}. \tag{29}$$

Otherwise, if the estimated available bitrate, $B_{user}$, for the respective conference participant device is lower than the current bitrate, $B_{encoder}$, for the video encoder 508, but higher than the current bitrate, $B_{encoder}$, for the video encoder 508 multiplied by a predetermined factor, $\beta$ (e.g., "$\beta$" can be equal to 0.95, or any other suitable value less than one), then the video encoder controller 510 sets the bitrate, $B_{encoder}$, for the video encoder 508 to be equal to the estimated available bitrate, $B_{user}$, for the respective conference participant device, as follows:

$$B_{encoder} = B_{user} \text{ if } B_{user} > \beta^* B_{encoder}. \tag{30}$$

Moreover, if the estimated available bitrate, $B_{user}$, for the respective conference participant device is lower than both the current bitrate, $B_{encoder}$, for the video encoder 508, and the current bitrate, $B_{encoder}$, for the video encoder 508 multiplied by the predetermined factor, $\beta$, then the video encoder controller 510 determines whether setting the bitrate, $B_{encoder}$, for the video encoder 508 to be equal to the estimated available bitrate, $B_{user}$, for the respective conference participant device would be expected to result in an acceptable QoE for multimedia transmissions to the plurality of conference participant devices 504.1, 504.2, 504.3, using any suitable technique known in the art. If it is determined that setting the bitrate, $B_{encoder}$, for the video encoder 508 to be equal to the estimated available bitrate, $B_{user}$, for the respective conference participant device would be expected to result in an acceptable QoE for such multimedia transmissions, then the video encoder controller 510 sets the bitrate, $B_{encoder}$, for the video encoder 508 to be equal to the estimated available bitrate, $B_{user}$, for the respective conference participant device, as follows:

$$B_{encoder} = B_{user} \text{ if } B_{user} \text{ would result in an acceptable QoE}. \tag{31}$$

Otherwise, if it is determined that setting the bitrate, $B_{encoder}$, for the video encoder 508 to be equal to the estimated available bitrate, $B_{user}$, for the respective conference participant device would not be expected to result in an acceptable QoE for such multimedia transmissions, then the MCU 502 creates an additional video encoder (or designates an existing video encoder) for use by the respective conference participant device.

Figure 7A:
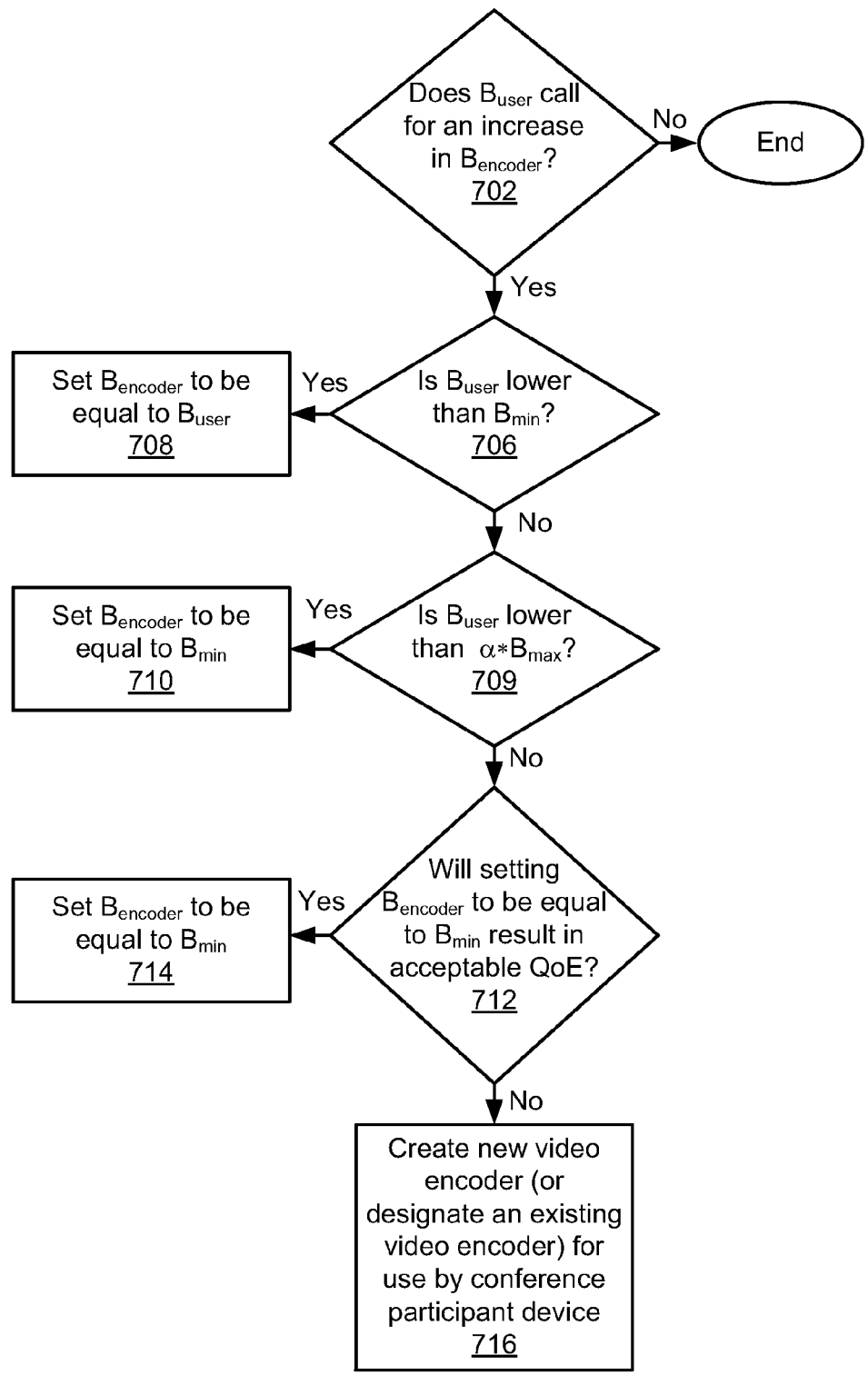
FIG. 7a is a flow diagram illustrating a first exemplary method of adjusting an average bitrate employed in a real-time transport protocol (RTP) session, in response to a receiver estimated maximum bitrate (REMB) message provided by the respective one of the plurality of conference participant devices of FIG. 5.

A first exemplary method of adjusting the average bitrate employed in an RTP session, in response to an REMB message provided by a respective one of a plurality of conference participant devices, is further described herein with reference to FIG. 7a. As depicted in block 702, a determination is made as to whether the estimated available bitrate ($B_{user}$) for the respective conference participant device (e.g., as obtained from the REMB message) calls for an increase in the current bitrate ($B_{encoder}$) for a video encoder employed in the RTP session. In the event the estimated available bitrate ($B_{user}$) for the respective conference participant device calls for an increase in the current bitrate ($B_{encoder}$) for the video encoder, a determination is made as to whether the estimated available bitrate ($B_{user}$) for the respective conference participant device is lower than the minimum available bitrate ($B_{min}$) for the plurality of conference participant devices, as depicted in block 706. In the event the estimated available bitrate ($B_{user}$) for the respective conference participant device is lower than the minimum available bitrate ($B_{min}$), the bitrate ($B_{encoder}$) for the video encoder is set to be equal to the estimated available bitrate ($B_{user}$) for the respective conference participant device, as depicted in block 708.

Otherwise, a determination is made as to whether the estimated available bitrate ($B_{user}$) for the respective conference participant device is lower than the maximum available bitrate ($B_{max}$) for the plurality of conference participant devices multiplied by a predetermined factor, α (e.g., 1.1 or any other suitable value), as depicted in block 709. In the event the estimated available bitrate ($B_{user}$) for the respective conference participant device is lower than the maximum available bitrate ($B_{max}$) for the plurality of conference participant devices multiplied by the predetermined factor, α, the bitrate ($B_{encoder}$) for the video encoder is set to be equal to the minimum available bitrate ($B_{min}$) for the plurality of conference participant devices, as depicted in block 710.

Otherwise, a determination is made as to whether setting the bitrate ($B_{encoder}$) for the video encoder to be equal to the minimum available bitrate ($B_{min}$) would be expected to result in an acceptable QoE for multimedia transmissions to the plurality of conference participant devices, as depicted in block 712. In the event setting the bitrate ($B_{encoder}$) for the video encoder to be equal to the minimum available bitrate ($B_{min}$) would be expected to result in an acceptable QoE for such multimedia transmissions, the bitrate ($B_{encoder}$) for the video encoder is set to be equal to the minimum available bitrate ($B_{min}$) for the plurality of conference participant devices, as depicted in block 714. In the event setting the bitrate ($B_{encoder}$) for the video encoder to be equal to the minimum available bitrate ($B_{min}$) would not be expected to result in an acceptable QoE for such multimedia transmissions, an additional video encoder is created (or an existing video encoder is designated) for use by the respective conference participant device, as depicted in block 716.

Figure 7B:
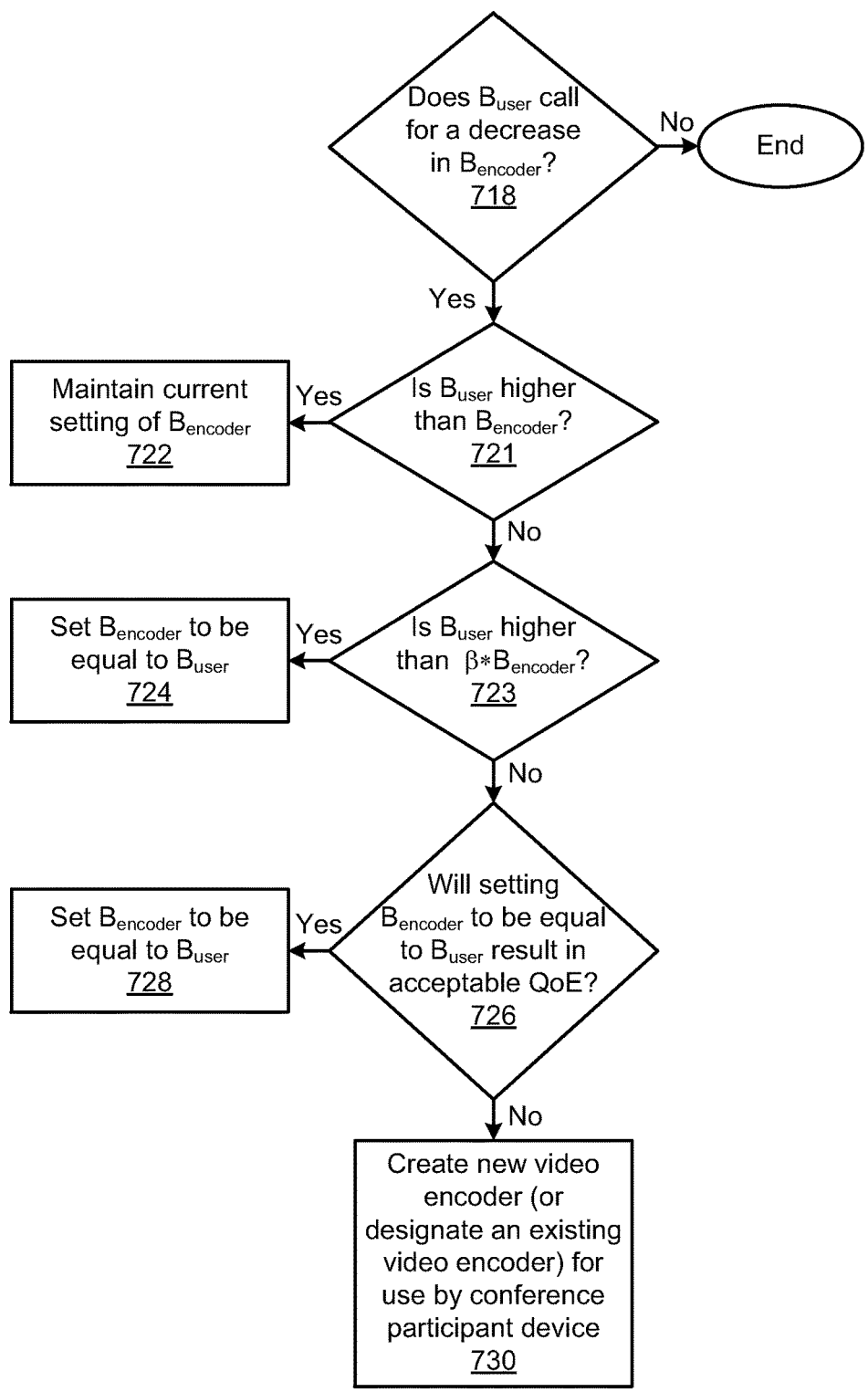
FIG. 7b is a flow diagram illustrating a second exemplary method of adjusting the average bitrate employed in an RTP session, in response to an REMB message provided by the respective one of the plurality of conference participant devices of FIG. 5.

A second exemplary method of adjusting the average bitrate employed in an RTP session, in response to an REMB message provided by a respective one of a plurality of conference participant devices, is further described herein with reference to FIG. 7b. As depicted in block 718, a determination is made as to whether the estimated available bitrate ($B_{user}$) for the respective conference participant device (e.g., as obtained from the REMB message) calls for a decrease in the current bitrate ($B_{encoder}$) for a video encoder employed in the RTP session. In the event the estimated available bitrate ($B_{user}$) for the respective conference participant device calls for a decrease in the current bitrate ($B_{encoder}$) for the video encoder, a determination is made as to whether the estimated available bitrate ($B_{user}$) for the respective conference participant device is higher than the current bitrate ($B_{encoder}$) for the video encoder, as depicted in block 721. In the event the estimated available bitrate ($B_{user}$) for the respective conference participant device is higher than the current bitrate ($B_{encoder}$) for the video encoder, the current setting of the bitrate ($B_{encoder}$) for the video encoder is maintained, as depicted in block 722.

Otherwise, a determination is made as to whether the estimated available bitrate ($B_{user}$) for the respective conference participant device is higher than the current bitrate ($B_{encoder}$) for the video encoder multiplied by a predetermined factor, β (e.g., 0.95 or any other suitable value less than one), as depicted in block 723. In the event the estimated available bitrate ($B_{user}$) for the respective conference participant device is higher than the current bitrate ($B_{encoder}$) for the video encoder multiplied by the predetermined factor, β, the bitrate ($B_{encoder}$) for the video encoder is set to be equal to the estimated available bitrate ($B_{user}$) for the respective conference participant device, as depicted in block 724. As depicted in block 726, a determination is made as to whether setting the bitrate ($B_{encoder}$) for the video encoder to be equal to the estimated available bitrate ($B_{user}$) for the respective conference participant device would be expected to result in an acceptable QoE for multimedia transmissions to the plurality of conference participant devices.

In the event setting the bitrate ($B_{encoder}$) for the video encoder to be equal to the estimated available bitrate ($B_{user}$) for the respective conference participant device would be expected to result in an acceptable QoE for such multimedia transmissions, the bitrate ($B_{encoder}$) for the video encoder is set to be equal to the estimated available bitrate ($B_{user}$) for the respective conference participant device, as depicted in block 728. In the event setting the bitrate ($B_{encoder}$) for the video encoder to be equal to the estimated available bitrate ($B_{user}$) for the respective conference participant device would not be expected to result in an acceptable QoE for such multimedia transmissions, an additional video encoder is created (or an existing video encoder is designated) for use by the respective conference participant device, as depicted in block 730.

Having described the above illustrative embodiments, other alternative embodiments are possible, and/or variations to these illustrative embodiments may be made. For example, it was described herein that an REMB message can be provided by a respective conference participant device to notify the MCU 502 of the estimated available bitrate, $B_{user}$, on a transmission path to the respective conference participant device. It was further described herein that the MCU 502 can use the estimated available bitrate, $B_{user}$, as well as the current bitrate, $B_{encoder}$, for the video encoder 508 and the maximum/minimum available bitrates, $B_{max}/B_{min}$, for the plurality of conference participant devices 504.1, 504.2, 504.3, to determine whether (1) to adjust the average bitrate employed in an RTP session, (2) to maintain the average bitrate employed in the RTP session unchanged, or (3) to create an additional video encoder (or designate an existing video encoder) for use by the respective conference participant device.

In an alternative embodiment, the respective conference participant device can employ the Session Description Protocol (SDP) to specify, to the MCU 502, an allowable bandwidth for RTCP report packets in the RTP session. Further, the MCU 502 can estimate the available bandwidth for the respective conference participant device, using reception quality feedback information provided by the respective conference participant device in one or more RTCP report packets. The MCU 502 can then estimate, on its own accord, the available bitrate, $B_{user}$, for the respective conference participant device to be the minimum of (1) the estimated available bandwidth for the respective conference participant device, (2) the estimated available bitrate as notified in the REMB message, and/or (3) the allowable bandwidth as specified by the SDP.

It was further described herein that the packet error feedback information can include at least an RTCP REMB packet (the "REMB message") for use in adjusting the average bitrate. In an alternative embodiment, the disclosed systems and methods can employ the temporary maximum media stream bit rate request (TMMBR) and temporary maximum media stream bit rate notification (TMMBN) messages for making such bitrate adjustments, in conformance with RFC 5104—*Codec Control Messages in the RTP Audio-Visual Profile with Feedback (AVPF)*, February 2008, or latest revision.

It will be apparent that one or more embodiments described herein may be implemented in many different forms of software and/or hardware. For example, one or more embodiments described herein may include suitable configurations of one or more computerized devices, hardware processors, and/or the like to carry out and/or support any or all of the systems and/or methods described herein. Further, one or more computers, computerized devices, microprocessors, digital signal processors, microcontrollers, random access memories (RAM), read only memories (ROM), data storage devices, etc., may be programmed and/or configured to implement the systems and methods described herein.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. In a multimedia communications system, a method of allocating one or more of processor resources and memory resources of a multimedia communications server, the multimedia communications server including at least a first video encoder, the multimedia communications system including a plurality of multimedia participant devices communicably coupleable to the multimedia communications server over at least one network, the method comprising:
   receiving, at the multimedia communications server in a process of joining a multimedia session, a request for use of a video encoder from a respective multimedia participant device, the request including one or more video encoder attributes;
   determining, by the multimedia communications server using at least some of the one or more video encoder attributes, a first cost of sharing the first video encoder among the respective multimedia participant device and at least one other multimedia participant device participating in the multimedia session;
   determining, by the multimedia communications server, a second cost of implementing an additional video encoder for use with the respective multimedia participant device;
   comparing the first cost with the second cost to obtain a comparison result; and
   based at least upon the comparison result, performing, by the multimedia communications server, one of sharing the first video encoder with the respective multimedia participant device, and implementing the additional video encoder for use with the respective multimedia participant device.

2. The method of claim 1 wherein the first video encoder is one of a plurality of first video encoders, wherein the first cost is one of a plurality of first costs, and wherein the determining of the first cost of sharing the first video encoder includes determining the plurality of first costs of sharing the plurality of first video encoders, respectively.

3. The method of claim 2 wherein the comparing of the first cost with the second cost includes determining a minimum first cost among the plurality of first costs, and comparing the minimum first cost with the second cost.

4. The method of claim 1 wherein the one or more video encoder attributes include at least a frame size and a target bitrate, and wherein the determining of the first cost of sharing the first video encoder includes determining one or more of (1) a third cost associated with a difference in frame sizes supported by the first video encoder and the respective multimedia participant device, and (2) a fourth cost associated with a target bitrate range of the first video encoder.

5. The method of claim 4 wherein the determining of the first cost of sharing the first video encoder further includes obtaining a sum of the third cost associated with the difference in the frame sizes and the fourth cost associated with the target bitrate range.

6. The method of claim 5 wherein the request further includes one or more video parameters, the one or more video parameters including at least a layout identifier and a codec type, and wherein the determining of the first cost of sharing the first video encoder further includes assigning a predetermined maximum cost to the first cost if one of the layout identifier and the codec type is not supported by the first video encoder.

7. The method of claim 6 wherein the determining of the first cost of sharing the first video encoder further includes assigning the predetermined maximum cost to the first cost if the target bitrate is outside the target bitrate range of the first video encoder.

8. The method of claim 4 wherein the determining of the first cost of sharing the first video encoder further includes determining whether the first video encoder is a scalable video encoder.

9. The method of claim 8 wherein the target bitrate range of the scalable video encoder is defined by a minimum bitrate and a maximum bitrate, and wherein the determining of the first cost of sharing the first video encoder further includes setting the maximum bitrate to be equal to the target bitrate if the minimum bitrate multiplied by a predetermined bitrate range factor is higher than or equal to the target bitrate.

10. The method of claim 9 wherein the determining of the first cost of sharing the first video encoder further includes setting the minimum bitrate to be equal to the target bitrate if the target bitrate multiplied by the predetermined bitrate range factor is higher than or equal to the maximum bitrate.

11. The method of claim 1 wherein the determining of the second cost of implementing the additional video encoder includes one or more of (1) determining a current availability of processor resources on the multimedia communications server, and (2) determining a current availability of memory resources on the multimedia communications server.

12. The method of claim 11 wherein one or more of (1) the determining of the current availability of processor resources on the multimedia communications server, and (2) the determining of the current availability of memory resources on the multimedia communications server includes determining a reference video encoder load for the multimedia communications server.

13. The method of claim 12 wherein the reference video encoder load corresponds to a central processing unit (CPU) load for running a reference video encoder having one or more of a predetermined resolution, a predetermined bitrate, and a predetermined frame rate, and wherein the method further comprises:

obtaining one or more scaling factors for one or more of the predetermined resolution, the predetermined bitrate, and the predetermined frame rate, respectively, of the reference video encoder if the additional video encoder does not support one or more of the predetermined resolution, the predetermined bitrate, and the predetermined frame rate.

14. The method of claim 11 wherein the determining of the second cost of implementing the additional video encoder further includes assigning a predetermined maximum cost to the second cost if one or more of (1) sufficient processor resources are not available on the multimedia communications server, and (2) sufficient memory resources are not available on the multimedia communications server.

15. A multimedia communications server for use in a multimedia communications system, the multimedia communications system including a plurality of multimedia participant devices communicably coupleable to the multimedia communications server over at least one network, the multimedia communications server comprising:

a first video encoder; and
a controller including at least one processor operative:
to receive, in a process of joining a multimedia session, a request for use of a video encoder from a respective multimedia participant device, the request including one or more video encoder attributes;
to determine, using at least some of the one or more video encoder attributes, a first cost of sharing the first video encoder among the respective multimedia participant device and at least one other multimedia participant device participating in the multimedia session;
to determine a second cost of implementing an additional video encoder for use with the respective multimedia participant device;
to compare the first cost with the second cost to obtain a comparison result; and
based at least upon the comparison result, to perform one of sharing the first video encoder with the respective multimedia participant device, and implementing the additional video encoder for use with the respective multimedia participant device.

16. The multimedia communications server of claim 15 wherein the first video encoder is one of a plurality of first video encoders, wherein the first cost is one of a plurality of first costs, and wherein the at least one processor is further operative to determine the plurality of first costs of sharing the plurality of first video encoders, respectively.

17. The multimedia communications server of claim 16 wherein the at least one processor is further operative to determine a minimum first cost among the plurality of first costs, and to compare the minimum first cost with the second cost.

18. The multimedia communications server of claim 15 wherein the one or more video encoder attributes include at least a frame size and a target bitrate, and wherein the at least one processor is further operative:

to determine one or more of (1) a third cost associated with a difference in frame sizes supported by the first video encoder and the respective multimedia participant device, and (2) a fourth cost associated with a target bitrate range of the first video encoder.

19. The multimedia communications server of claim 18 wherein the at least one processor is further operative:

to determine the first cost of sharing the first video encoder as a sum of the third cost associated with the difference in the frame sizes and the fourth cost associated with the target bitrate range.

\* \* \* \* \*